(12) United States Patent
Tsukigi et al.

(10) Patent No.: US 10,732,018 B2
(45) Date of Patent: *Aug. 4, 2020

(54) CLAMP-ON TYPE ULTRASONIC FLOW SENSOR

(71) Applicant: Keyence Corporation, Osaka (JP)

(72) Inventors: Shinichi Tsukigi, Osaka (JP); Yasunori Kawaguchi, Osaka (JP)

(73) Assignee: KEYENCE CORPORATION, Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/268,512

(22) Filed: Feb. 6, 2019

(65) Prior Publication Data

US 2019/0285450 A1    Sep. 19, 2019

(30) Foreign Application Priority Data

Mar. 14, 2018    (JP) ................. 2018-047212

(51) Int. Cl.
*G01F 1/66*    (2006.01)
*G01F 15/14*    (2006.01)

(52) U.S. Cl.
CPC .............. *G01F 1/667* (2013.01); *G01F 1/662* (2013.01); *G01F 15/14* (2013.01)

(58) Field of Classification Search
CPC .................... G01F 1/66; G01F 15/18
See application file for complete search history.

(56) References Cited

U.S. PATENT DOCUMENTS

| 9,671,263 | B2 | 6/2017 | Otsu et al. | |
|---|---|---|---|---|
| 9,671,264 | B2 | 6/2017 | Kashima | |
| 9,696,195 | B2 | 7/2017 | Ishikawa et al. | |
| 10,190,896 | B2 | 1/2019 | Makino et al. | |
| 10,203,234 | B2 | 2/2019 | Ishikawa et al. | |
| 10,281,437 | B2* | 5/2019 | Leaders | G01N 29/02 |
| 2013/0080081 | A1* | 3/2013 | Dugger | G01F 1/667 702/48 |
| 2016/0334252 | A1* | 11/2016 | Kashima | G01F 1/662 |
| 2018/0003536 | A1* | 1/2018 | Wiest | G01F 1/662 |
| 2019/0033106 | A1* | 1/2019 | Ramond | G01F 1/662 |
| 2019/0154480 | A1* | 5/2019 | Schob | G01F 1/662 |
| 2019/0285454 | A1* | 9/2019 | Koyama | G01F 15/18 |
| 2019/0390991 | A1* | 12/2019 | Pape | G01F 1/667 |

OTHER PUBLICATIONS

U.S. Appl. No. 16/268,510, filed Feb. 6, 2019 (92 pages).
U.S. Appl. No. 16/268,513, filed Feb. 6, 2019 (88 pages).
U.S. Appl. No. 16/268,514, filed Feb. 6, 2019 (99 pages).

* cited by examiner

*Primary Examiner* — Jewel V Dowtin

(74) *Attorney, Agent, or Firm* — Kilyk & Bowersox, P.L.L.C.

(57) ABSTRACT

To provide a clamp-on type ultrasonic flow sensor capable of preventing deterioration in measurement accuracy of a flow rate due to deformation of a pipe. Elastic couplants CP1 and CP2 formed to surround the outer circumferential surface of a pipe are fixed while being pressed on the pipe P by fixing inner surfaces FS of two clamp members 131 and 132. An ultrasonic wave is propagated through the elastic couplants CP1 and CP2 and fluid in the pipe between a first ultrasonic element 101 and a second ultrasonic element 102. A cross section of the fixing inner surfaces FS of the clamp members 131 and 132 has a shape of a regular even-numbered polygonal shape centering on the axis of the pipe.

9 Claims, 12 Drawing Sheets

CLAMP-ON TYPE ULTRASONIC FLOW SENSOR

CROSS-REFERENCE TO RELATED APPLICATIONS

The present application claims foreign priority based on Japanese Patent Application No. 2018-047212, filed Mar. 14, 2018, the contents of which is incorporated herein by reference.

BACKGROUND OF THE INVENTION

1. Field of the Invention

The present invention relates to a clamp-on type ultrasonic flow sensor that detects a flow rate of fluid flowing in a pipe.

2. Description of Related Art

A flow sensor is used to measure a flow rate of fluid flowing in a pipe. As an example of the flow sensor, JP-A-2016-217733 (Patent Literature 1) describes an ultrasonic flow switch configured to be attachable to a pipe.

Specifically, in this ultrasonic flow switch, an upper clamp member and a lower clamp member are disposed to clamp the pipe and coupled using screws. A housing section that houses two ultrasonic elements is detachably fixed to the upper clamp member. In this state, an ultrasonic wave is transmitted from one ultrasonic element to the other ultrasonic element through fluid in the pipe. An ultrasonic wave is transmitted from the other ultrasonic element to one ultrasonic element through the fluid in the pipe.

The ultrasonic flow switch calculates a time difference between a time from a point in time when the ultrasonic wave is transmitted by one ultrasonic element until a point in time when the ultrasonic wave is received by the other ultrasonic element and a time from a point in time when the ultrasonic wave is transmitted by the other ultrasonic element until a point in time when the ultrasonic wave is received by one ultrasonic element. The ultrasonic flow switch calculates a flow rate of the fluid flowing in the pipe on the basis of the calculated time difference and a predetermined formula.

SUMMARY OF THE INVENTION

In the ultrasonic flow switch, the upper clamp member and the lower clamp member are coupled to clamp the pipe, whereby a fixed pressing force is applied from the upper clamp member and the lower clamp member to the pipe. Therefore, when the upper clamp member and the lower clamp member are attached to a pipe made of resin having flexibility, the pipe is highly likely to be gently deformed as time elapses. Such gradual deformation of the resin by continuous application of a load to the resin is called creep deformation.

The formula predetermined to calculate a flow rate of fluid includes a design dimension of an inner diameter of a pipe. Therefore, when creep deformation occurs in a flow rate measurement target pipe, it is likely that an accurate flow rate cannot be calculated as time elapses.

An object of the present invention is to provide a clamp-on type ultrasonic flow sensor capable of preventing deterioration in measurement accuracy of a flow rate due to deformation of a pipe.

(1) A clamp-on type ultrasonic flow sensor according to the present invention is a clamp-on type ultrasonic flow sensor that measures a flow rate of fluid flowing in a pipe, the clamp-on type ultrasonic flow sensor including: a first ultrasonic element capable of transmitting and receiving an ultrasonic wave; a second ultrasonic element capable of transmitting and receiving an ultrasonic wave; a solid elastic couplant configured to be capable of transmitting the ultrasonic wave transmitted from the first ultrasonic element to the pipe and transmitting the ultrasonic wave transmitted from the fluid in the pipe to the pipe to the second ultrasonic element and configured to be capable of transmitting the ultrasonic wave transmitted from the second ultrasonic element to the pipe and transmitting the ultrasonic wave transmitted from the fluid in the pipe to the pipe to the first ultrasonic element; a fixing member configured to fix the elastic couplant while pressing the elastic couplant on the pipe; and a flow-rate calculating section configured to calculate a flow rate of the fluid flowing in the pipe on the basis of a difference between a propagation time of the ultrasonic wave transmitted from the first ultrasonic element to the second ultrasonic element and a propagation time of the ultrasonic wave transmitted from the second ultrasonic element to the first ultrasonic element. The elastic couplant is formed to surround an outer circumferential surface of the pipe. The fixing member is formed to surround an outer circumferential surface of the elastic couplant and includes a fixing inner surface in contact with the elastic couplant. In a cross section of the fixing member orthogonal to an axis of the pipe, the fixing inner surface has a regular polygonal shape that centers on the axis of the pipe and, opposed two sides of which are parallel.

In the clamp-on type ultrasonic flow sensor, the elastic couplant formed to surround the outer circumferential surface of the pipe is fixed while being pressed on the pipe by the fixing member. In this state, the ultrasonic wave transmitted from the first ultrasonic element is transmitted to the fluid in the pipe through the pipe by the elastic couplant. The ultrasonic wave transmitted from the fluid to the pipe again is transmitted to the second ultrasonic element by the elastic couplant. Further, the ultrasonic wave transmitted from the second ultrasonic element is transmitted to the fluid in the pipe through the pipe by the elastic couplant. The ultrasonic wave transmitted from the fluid to the pipe again is transmitted to the first ultrasonic element by the elastic couplant.

The flow rate of the fluid flowing in the pipe is calculated on the basis of the difference between the propagation time of the ultrasonic wave transmitted to the second ultrasonic element and the propagation time of the ultrasonic wave transmitted from the second ultrasonic element to the first ultrasonic element.

At this time, the flow rate of the fluid flowing in the pipe is calculated on the basis of a predetermined formula including a design dimension of an inner diameter on the assumption that the cross section of the inner circumferential surface of the pipe orthogonal to the axis is a perfect circle having the design dimension of the inner diameter as a diameter. Therefore, when the pipe is deformed, it is likely that the flow rate cannot be accurately calculated by the predetermined formula. However, when the circumferential length of the cross section of the inner circumferential surface of the pipe does not change and the cross section of the inner circumferential surface is deformed from the perfect circle into a regular even-numbered polygonal shape, it is possible to accurately calculate the flow rate respectively before and after the deformation by using the predetermined formula including the design dimension of the inner diameter.

With the configuration explained above, the fixing inner surface of the fixing member presses the elastic couplant on the pipe while being in contact with the outer circumferential surface of the elastic couplant. In this case, since the cross section of the fixing inner surface has the regular even-numbered polygonal shape centering on the axis of the pipe, in the cross section of the pipe, a pressing force acts on the outer circumferential surface of the pipe in a direction from sides of the regular even-numbered polygonal shape of the fixing inner surface toward the axis. Therefore, the deformation of the pipe is limited to the deformation of the cross section of the pipe from the perfect circle into the regular even-numbered polygonal shape corresponding to the cross section of the fixing inner surface.

As a result, even when the pipe is deformed, it is possible to calculate an accurate flow rate without changing a calculation method. As a result, it is possible to prevent deterioration in measurement accuracy of the flow rate due to the deformation of the pipe.

(2) The elastic couplant may include an acoustic contact surface that is in contact with the outer circumferential surface of the pipe in order to transmit the ultrasonic wave between the first and second ultrasonic elements and the pipe. A cross section of the acoustic contact surface orthogonal to the axis of the pipe in a state in which the acoustic contact surface is in contact with the outer circumferential surface of the pipe may have a shape corresponding to the outer circumferential surface of the pipe.

In this case, since the acoustic contact surface has the shape corresponding to the shape of the outer circumferential surface of the pipe, it is easy to attach the elastic couplant to the pipe. The deformation of the pipe due to the pressing of the elastic couplant on the pipe is reduced. Therefore, occurrence of a pressure loss in the pipe involved in the deformation of the pipe is reduced.

(3) The elastic couplant may include: a first elastic couplant provided to be in contact with a portion in a circumferential direction of the outer circumferential surface of the pipe; and a second elastic couplant provided to be in contact with another portion in the circumferential direction of the outer circumferential surface of the pipe. The fixing member may include: a first attachment member configured to press the first elastic couplant on the pipe; a second attachment member configured to press the second elastic couplant on the pipe; and a coupling member configured to couple the first attachment member and the second attachment member.

In this case, in a state in which the first attachment member presses the first elastic couplant against a portion of the outer circumferential surface of the pipe and the second attachment member presses the second elastic couplant against another portion of the outer circumferential surface of the pipe, the first and second attachment members can be coupled by the coupling member. Consequently, it is easy to attach the elastic couplant and the fixing member to an existing pipe.

(4) The first attachment member may include a first coupling portion having a semi-cylindrical shape. The second attachment member may include a second coupling portion having a semi-cylindrical shape. The first and second coupling portions may form one fastened section having a cylindrical shape when inner surfaces of the first and second coupling portions are disposed to be opposed to each other in a state in which the first and second attachment members are attached to the pipe. The coupling member may be a fastening member formed to be fastenable to the one fastened section.

Consequently, it is possible to easily attach the fixing member to the existing pipe with a simple configuration.

(5) The fastening member may include first and second members. The first and second members may be configured to be connectable to each other to clamp the pipe and detachable from each other.

Consequently, it is possible to easily attach the fixing member to the existing pipe with a simple configuration.

(6) The clamp-on type ultrasonic flow sensor may further include an elastic member attached to at least one of the first and second attachment members. The elastic member may be configured to clamp the pipe to thereby fix at least one attachment member to the pipe.

In this case, at least one attachment member is fixed to the pipe by the elastic member. Therefore, it is possible to more easily attach the fixing member to the existing pipe.

(7) The first attachment member may include a first element holding section configured to hold the first ultrasonic element. The second attachment member may include a second element holding section configured to hold the second ultrasonic element.

In this case, the first attachment member can be attached to the pipe in a state in which the first ultrasonic element is held by the first element holding section. The second attachment member can be attached to the pipe in a state in which the second ultrasonic element is held by the second element holding section. Consequently, it is easy to attach the first and second ultrasonic elements to the existing pipe.

(8) The fixing member may be formed of carbon reinforced resin.

In this case, since the strength of the fixing member is secured, an attachment state of the fixing member to the pipe is stabilized and deformation of the fixing member is prevented. Corrosion resistance of the fixing member is improved.

(9) A cross section of the acoustic contact surface may have a regular polygonal shape that corresponds to the outer circumferential surface of the pipe and, opposed two sides of which are parallel. The elastic couplant may include first and second elastic couplants divided by a division surface that includes a straight line passing two vertexes opposed to each other in a cross section of the regular polygonal shape of the acoustic contact surface and a center of the regular polygonal shape and is parallel to the axis of the pipe.

In this case, acoustic contact surfaces of the first and second elastic couplants include both end portions inclining with respect to the division surface in the cross section orthogonal to the axis of the pipe. Consequently, it is possible to easily guide the pipe to appropriate positions on the acoustic contact surfaces of the first and second elastic couplants. Therefore, it is easy to attach the first and second elastic couplants to a pipe having flexibility.

According to the present invention, it is possible to prevent deterioration in measurement accuracy of a flow rate due to deformation of a pipe.

DESCRIPTION OF EMBODIMENTS

[1] Schematic Configuration of a Clamp-on Type Ultrasonic Flow Sensor

Figure 1:
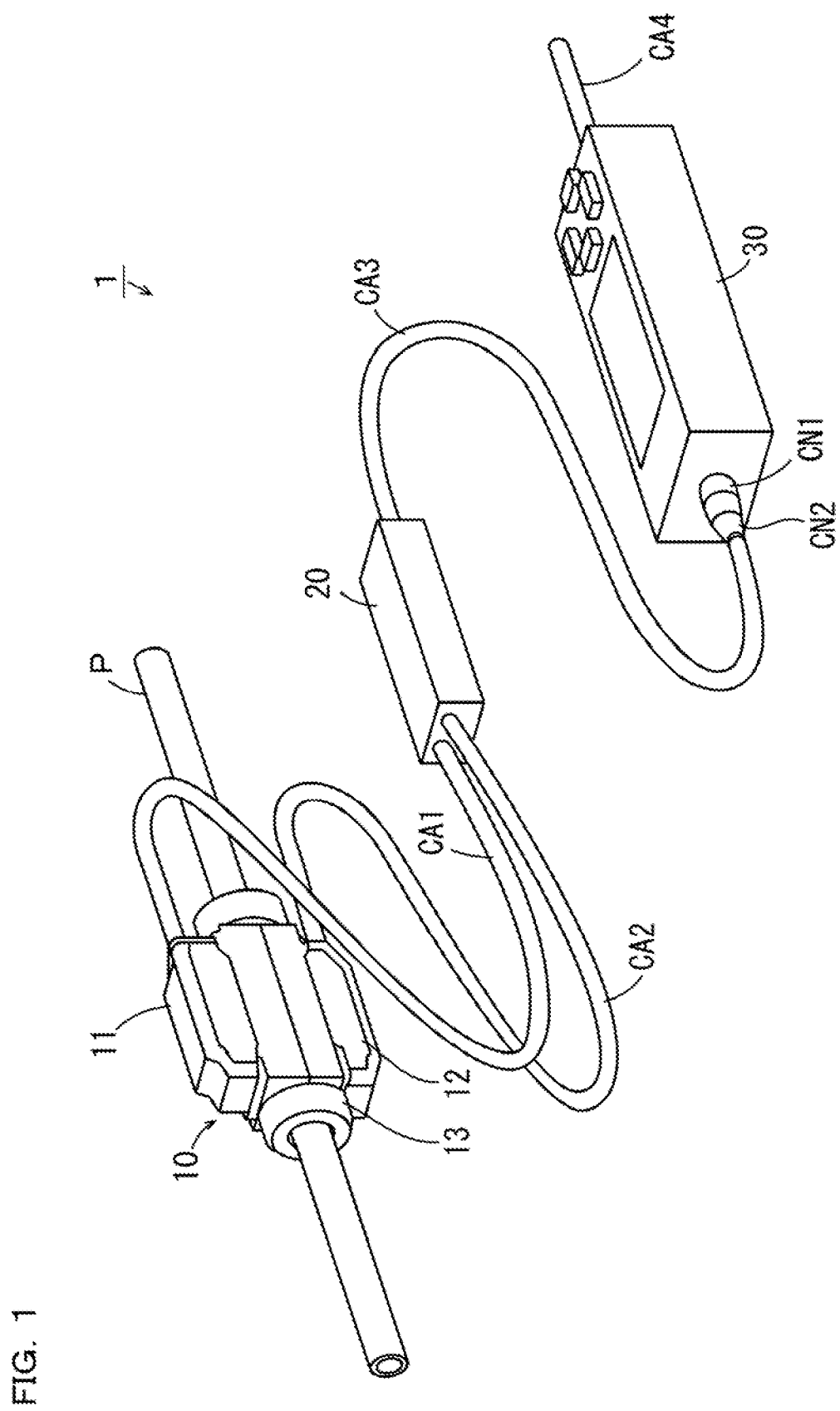
FIG. 1 is an exterior perspective view of a flow sensor according to an embodiment of the present invention.

A clamp-on type ultrasonic flow sensor (hereinafter abbreviated as flow sensor) according to an embodiment of the present invention is explained with reference to the drawings. FIG. 1 is an exterior perspective view of the flow sensor according to the embodiment of the present invention. As shown in FIG. 1, a flow sensor 1 according to this embodiment is configured mainly from a head section 10, a relay section 20, and a main body section 30.

The head section 10 includes a first head section 11, a second head section 12, and a head fixing mechanism 13. The first head section 11 and the second head section 12 are attached to the outer circumferential surface of a pipe P in a state in which the first head section 11 and the second head section 12 are held by the head fixing mechanism 13. In this embodiment, the pipe P is a relatively small resin pipe and has a diameter (an outer diameter) of, for example, 2 mm or more and 20 mm or less. Fluid flows in the pipe P.

A first head cable CA1 is connected between the first head section 11 and the relay section 20. A second head cable CA2 is connected between the second head section 12 and the relay section 20. A relay cable CA3 is connected between the relay section 20 and the main body section 30. Connectors CN1 and CN2 are respectively provided in the main body section 30 and the relay cable CA3. The connectors CN1 and CN2 are configured to be attachable to and detachable from each other. One end of a main body cable CA4 is further connected to the main body section 30. The other end of the main body cable CA4 is connected to an external apparatus (not shown in FIG. 1) of the flow sensor 1. The external apparatus is, for example, a personal computer or a programmable logic controller.

Figure 2:
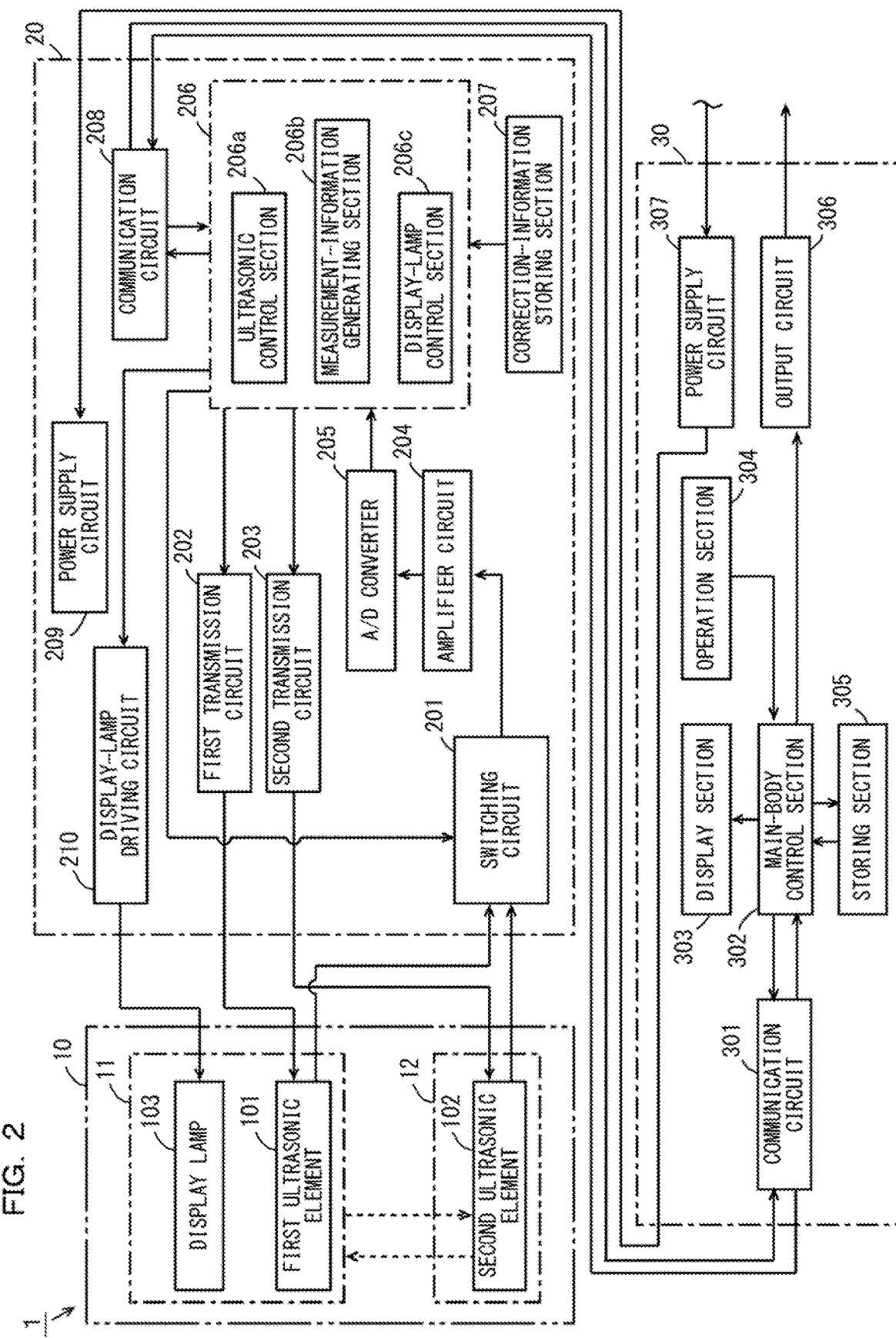
FIG. 2 is a block diagram showing the configuration of an electric system of the flow sensor shown in FIG. 1.

FIG. 2 is a block diagram showing the configuration of an electric system of the flow sensor 1 shown in FIG. 1. As shown in FIG. 2, in the head section 10, the first head section 11 includes a first ultrasonic element 101 and a display lamp 103 and the second head section 12 includes a second ultrasonic element 102.

The first ultrasonic element 101 of the first head section 11 transmits an ultrasonic wave in response to a first driving signal generated by a first transmission circuit 202 explained below. The first ultrasonic element 101 receives an ultrasonic wave and outputs an ultrasonic signal of an analog format corresponding to the received ultrasonic wave.

On the other hand, the second ultrasonic element 102 of the second head section 12 transmits an ultrasonic wave in response to a second driving signal generated by a second transmission circuit 203 explained below. The second ultrasonic element 102 receives an ultrasonic wave and outputs an ultrasonic signal of an analog format corresponding to the received ultrasonic wave. The display lamp 103 includes, for example, a plurality of light emitting diodes that emit lights in different colors. The display lamp 103 is lit or flashed in a plurality of kinds of forms in response to a third driving signal generated by a display-lamp driving circuit 210 explained below.

The relay section 20 includes a switching circuit 201, a first transmission circuit 202, a second transmission circuit 203, an amplifier circuit 204, an A/D (analog/digital) converter 205, a relay control section 206, a correction-information storing section 207, a communication circuit 208, a power supply circuit 209, and a display-lamp driving circuit 210.

The switching circuit 201 is connected to the first ultrasonic element 101 via the first head cable CA1 shown in FIG. 1 and connected to the second ultrasonic element 102 via the second head cable CA2 shown in FIG. 1. In the relay section 20, the switching circuit 201 is connected to the amplifier circuit 204. The switching circuit 201 switches a connection state of the first and second ultrasonic elements 101 and 102 and the amplifier circuit 204 between a first state and a second state on the basis of control by the relay control section 206.

The first state is a state in which the second ultrasonic element 102 and the amplifier circuit 204 are connected and the first ultrasonic element 101 and the amplifier circuit 204 are not connected. In the first state, the second ultrasonic element 102 receives an ultrasonic wave, whereby an ultrasonic signal output from the second ultrasonic element 102 is given to the amplifier circuit 204.

The second state is a state in which the first ultrasonic element 101 and the amplifier circuit 204 are connected and the second ultrasonic element 102 and the amplifier circuit 204 are not connected. In the second state, the first ultrasonic element 101 receives an ultrasonic wave, whereby an ultrasonic signal output from the first ultrasonic element 101 is given to the amplifier circuit 204.

Each of the first transmission circuit 202 and the second transmission circuit 203 includes a tristate driver. In the first transmission circuit 202, an output state of the tristate driver is switched among three states (an H level state, an L level state, and a high impedance state) on the basis of the control by the relay control section 206. Consequently, the first driving signal is generated. In the second transmission circuit 203, an output state of the tristate driver is switched among the three states on the basis of the control by the relay control section 206. Consequently, the second driving signal is generated.

In predetermined signal processing, the amplifier circuit 204 amplifies, with a predetermined gain, an ultrasonic signal given from the first transmission circuit 202 or the second transmission circuit 203. The amplifier circuit 204 gives the ultrasonic signal after the signal processing to the A/D converter 205. The A/D converter 205 performs A/D conversion processing of the given ultrasonic signal as predetermined signal processing. The A/D converter 205 gives an ultrasonic signal of a digital format after the signal processing to the relay control section 206.

The relay control section 206 is configured by, for example, an FPGA (Field-Programmable Gate Array) or a CPU (Central Processing Unit) and a memory. The relay control section 206 includes an ultrasonic control section 206*a*, a measurement-information generating section 206*b*, and a display-lamp control section 206*c* as functional sections. When the relay control section 206 is configured by the CPU and the memory, these functional sections are realized by the CPU executing a computer program stored in the memory. A part of the ultrasonic control section 206*a*, the measurement-information generating section 206*b*, and the display-lamp control section 206*c* may be realized by an electronic circuit (hardware) such as an FPGA. The remaining part may be realized by the CPU executing the computer program.

The ultrasonic control section 206*a* controls the switching circuit 201, the first transmission circuit 202, and the second transmission circuit 203 in response to a transmission control signal explained below transmitted from the main body section 30. For example, the ultrasonic control section 206*a* shifts the connection state between the first and second ultrasonic elements 101 and 102 and the amplifier circuit 204 to the first state and, at the same time, operates the first transmission circuit 202 to generate the first driving signal. In this case, an ultrasonic wave is transmitted from the first ultrasonic element 101. The transmitted ultrasonic wave is received by the second ultrasonic element 102 through the pipe P shown in FIG. 1 and the fluid in the pipe P. Consequently, an ultrasonic signal output from the second ultrasonic element 102 is given to the relay control section 206 while being processed by the amplifier circuit 204 and the A/D converter 205.

The ultrasonic control section 206*a* shifts the connection state between the first and second ultrasonic elements 101 and 102 and the amplifier circuit 204 to the second state and, at the same time, operates the second transmission circuit 203 to generate the second driving signal. In this case, an ultrasonic wave is transmitted from the second ultrasonic element 102. The transmitted ultrasonic wave is received by the first ultrasonic element 101 through the pipe P shown in FIG. 1 and the fluid in the pipe P. Consequently, an ultrasonic signal output from the first ultrasonic element 101 is given to the relay control section 206 while being processed by the amplifier circuit 204 and the A/D converter 205.

The measurement-information generating section 206*b* generates, on the basis of the ultrasonic signals output from the first and second ultrasonic elements 101 and 102, as measurement information, a difference between a propagation time of the ultrasonic wave transmitted from the first ultrasonic element 101 to the second ultrasonic element 102 and a propagation time of the ultrasonic wave transmitted from the second ultrasonic element 102 to the first ultrasonic element 101 (hereinafter referred to as time difference). Specifically, the measurement-information generating section 206*b* calculates the time difference from a peak of a cross-correlation function of signal waveforms of the given two ultrasonic signals.

The measurement-information generating section 206*b* may respectively measure a time until the ultrasonic wave transmitted from the first ultrasonic element 101 is received by the second ultrasonic element 102 and a time until the ultrasonic wave transmitted from the second ultrasonic element 102 is received by the first ultrasonic element 101 and calculate a difference between the times as the time difference.

The display-lamp control section 206*c* controls the display-lamp driving circuit 210 in response to a display control signal explained below transmitted from the main body section 30. The display-lamp driving circuit 210 is connected to the display lamp 103 via the first head cable CA1 shown in FIG. 1. The display-lamp driving circuit 210 generates the third driving signal for driving the display lamp 103 on the basis of the control by the display-lamp control section 206*c*.

The correction-information storing section 207 is configured by, for example, a nonvolatile memory. The correction-information storing section 207 stores correction information for correcting a predetermined relation between the measurement information generated by the measurement-information generating section 206 and a flow rate of the fluid in the pipe P. Details of the correction information are explained below.

The communication circuit 208 is connected to one end of the relay cable CA3 shown in FIG. 1. The communication circuit 208 outputs measurement information of a digital format generated by the measurement-information generating section 206*b* and the correction information to the main body section 30 through the relay cable CA3. The communication circuit 208 gives a transmission control signal and a display control signal input from the main body section 30 through the relay cable CA3 to the relay control section 206. The transmission control signal is a control signal for controlling the first transmission circuit 202 and the second transmission circuit 203. The display control signal is a control signal for controlling the display-lamp driving circuit 210.

The power supply circuit 209 receives electric power supplied from the main body section 30 through the relay cable CA3 and supplies the received electric power to the other components provided in the relay section 20.

The main body section 30 includes a communication circuit 301, a main-body control section 302, a display section 303, an operation section 304, a storing section 305, an output circuit 306, and a power supply circuit 307. The communication circuit 301 is connected to the other end of the relay cable CA3 shown in FIG. 1. The communication circuit 301 gives the measurement information and the correction information output from the relay section 20 through the relay cable CA3 to the main-body control section 302. The communication circuit 301 outputs a transmission control signal and a display control signal generated in the main-body control section 302 as explained below to the relay section 20 through the relay cable CA3.

The display section 303 includes, for example, a segment display or a dot matrix display and displays, for example, a flow rate of the fluid flowing in the pipe P on the basis of the control by the main-body control section 302. The operation section 304 includes a plurality of operation buttons. A user can input various kinds of information used for measurement of a flow rate by operating the operation section 304. The various kinds of information used for measurement of a flow rate include the material of the pipe P to which the head section 10 is attached, the inner diameter of the pipe P, the outer diameter of the pipe P, velocity of an ultrasonic wave in the fluid, an incident angle of the ultrasonic wave on the fluid, and a flow rate correction coefficient explained below. The user can input, by operating the operation section 304, an output condition of a flow rate value that should be output to the outside of the flow sensor 1. The storing section 305 is configured by a nonvolatile memory or a hard disk drive.

The main-body control section 302 includes, for example, a CPU and a memory and generates a transmission control signal and a display control signal that should be given to the relay section 20 in order to respectively drive the first ultrasonic element 101, the second ultrasonic element 102, and the display lamp 103. The main-body control section 302 performs setting of various kinds of information input by the operation section 304. Specifically, the main-body control section 302 causes the storing section 305 to store the various kinds of information input by the operation section 304. Further, the main-body control section 302 calculates a flow rate of the fluid flowing in the pipe P on the basis of the measurement information and the correction information given from the communication circuit 301 and various kinds of information set in advance. The main-body control section 302 outputs the calculated flow rate (a flow rate value) according to an output condition set in advance.

In the main body section 30, the user can input a correction value and the like concerning the measurement of a flow rate by operating the operation section 304. In this case, the main-body control section 302 can correct a calculation result of the flow rate on the basis of the input information.

The output circuit 306 is connected to one end of the main body cable CA4 shown in FIG. 1. The output circuit 306 outputs the flow rate value output from the main-body control section 302 to the external apparatus of the flow sensor 1 through the main body cable CA4.

The power supply circuit 307 receives electric power supplied from a commercial power supply through a not-shown power supply cable and supplies a part of the received electric power to the other components provided in the main body section 30. The power supply circuit 307 supplies the remainder of the received electric power to the power supply circuit 209 of the relay section 20 through the relay cable CA3.

A threshold of a flow rate may be stored in the storing section 305 as the output condition. In this case, the main-body control section 302 may generate an ON/OFF signal on the basis of a comparison result of a calculated flow rate and a threshold of a flow rate set in advance. The ON/OFF signal is a signal for switching an ON state and an OFF state of the external apparatus connected to the main body section 30 through the main body cable CA4. The output circuit 306 outputs the generated ON/OFF signal to the external apparatus, whereby the flow sensor 1 functions as a flow switch. The communication circuit 301 may output the generated ON/OFF signal to the relay section 20 as a display control signal. In this case, in the relay section 20, the display-lamp control section 206c generates the third driving signal on the basis of the ON/OFF signal. Consequently, a display form of the display lamp 103 can be controlled in a form corresponding to the flow rate and the state of the external apparatus.

[2] Calculation Method for a Flow Rate

Figure 3:
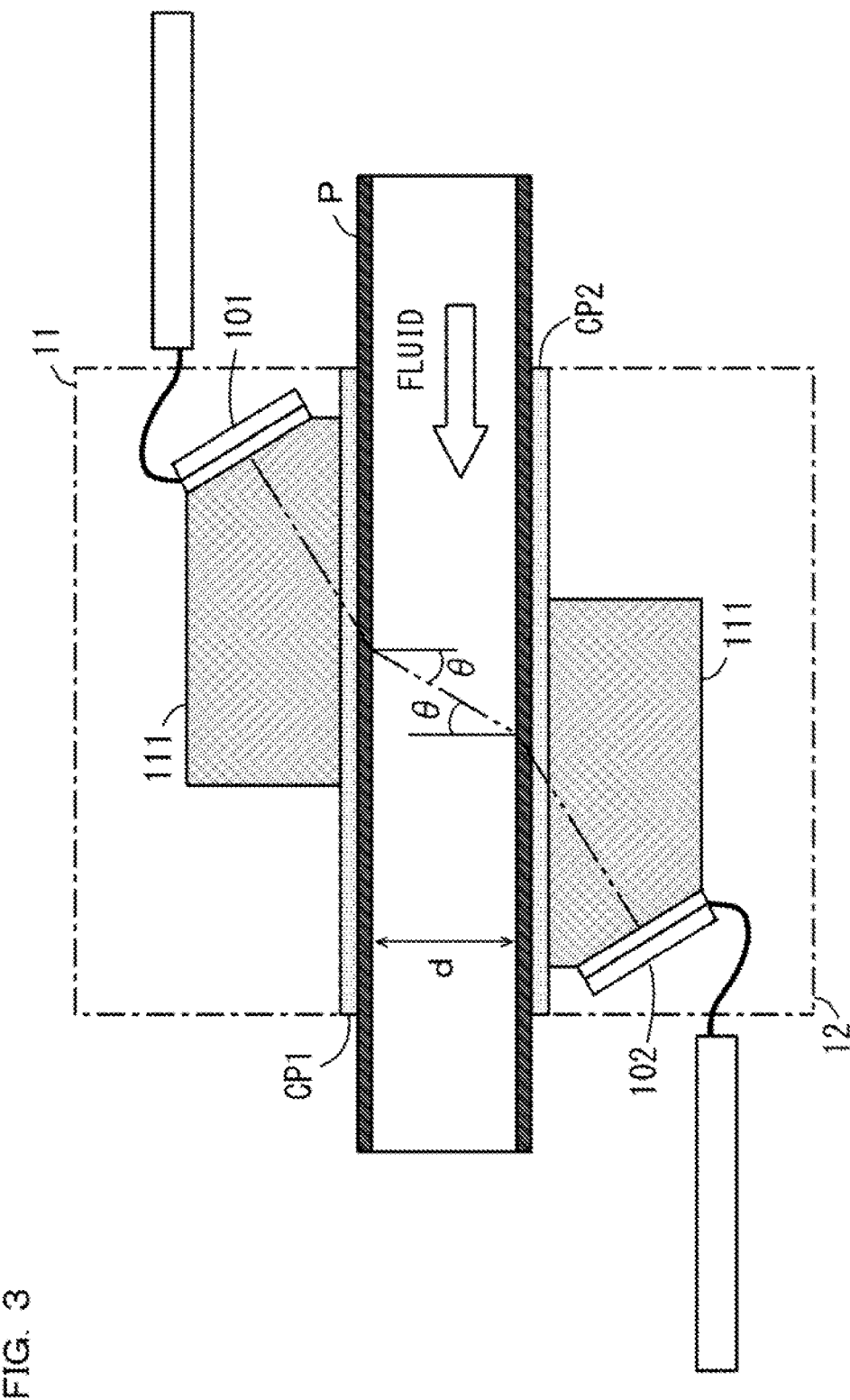
FIG. 3 is a schematic sectional view showing a first ultrasonic element, a second ultrasonic element, and peripheral members thereof for explaining a calculation method for a flow rate in the flow sensor shown in FIG. 1.

FIG. 3 is a schematic sectional view showing the first ultrasonic element 101, the second ultrasonic element 102, and peripheral members thereof for explaining a calculation method for a flow rate in the flow sensor 1 shown in FIG. 1.

As shown in FIG. 3, in the head section 10 shown in FIG. 1, a solid elastic couplant CP1 is provided to be in contact with a part of the outer circumferential surface of the pipe P. A solid elastic couplant CP2 is provided to be in contact with another portion of the outer circumferential surface of the pipe P. The elastic couplants CP1 and CP2 are formed of a soft elastic material made of solid polymeric rubber or a solid gel substance. The hardness of the elastic couplants CP1 and CP2 is, for example, 20 degrees to 40 degrees. The elastic couplants CP1 and CP2 are formed to surround the outer circumferential surface of the pipe P and are fixed while being pressed against the pipe P such that the inner circumferential surfaces thereof adhere to the outer circumferential surface of the pipe P.

The first head section 11 includes a wedge material 111 that transmits an ultrasonic wave. The first head section 11 is provided such that the wedge material 111 is in contact with the outer circumferential surface of the elastic couplant CP1. Like the first head section 11, the second head section 12 includes the wedge material 111 that transmits an ultrasonic wave. The second head section 12 is provided such that the wedge material 111 is in contact with the outer circumferential surface of the elastic couplant CP2. The wedge material 111 is formed of a non-metal material having high rigidity and high acoustic transparency. The wedge material 111 is desirably formed of a material having high environment resistance.

The elastic couplants CP1 and CP2 are disposed to be in contact with the wedge material 111 and the pipe P to thereby match acoustic impedances of the wedge material 111 and the pipe P.

The fluid flows in the pipe P in a state in which the first head section 11 and the second head section 12 are attached to the pipe P. Consequently, it is possible to transmit and receive an ultrasonic wave between the first ultrasonic element 101 and the second ultrasonic element 102. In the relay section 20 shown in FIG. 2, the various circuits are controlled such that an ultrasonic wave is transmitted from the first ultrasonic element 101 to the second ultrasonic element 102 and an ultrasonic signal output from the second ultrasonic element 102 is input to the amplifier circuit 204. The various circuits are controlled such that an ultrasonic wave is transmitted from the second ultrasonic element 102 to the first ultrasonic element 101 and an ultrasonic signal output from the first ultrasonic element 101 is input to the amplifier circuit 204. Thereafter, a time difference is calculated on the basis of the two ultrasonic signals.

Before measurement of a flow rate, at least the inner diameter of the pipe P, velocity of an ultrasonic wave in the fluid, an incident angle of the ultrasonic wave on the fluid, and a flow rate correction coefficient are set in the flow sensor 1. The flow rate correction coefficient is a coefficient for converting velocity of the fluid having a predetermined distribution in the cross section of the pipe P into average velocity.

The main-body control section 302 shown in FIG. 2 can theoretically calculate a flow rate Q of the fluid flowing in the pipe P on the basis of the following Expression (1) in a state in which the cross section of the inner circumferential surface of the pipe P orthogonal to the axis of the pipe P is assumed to be a perfect circle having an inner diameter of a design dimension. In Expression (1), $\Delta t$ represents a time difference calculated in the relay section 20, d represents the inner diameter of the pipe P, $\theta$ represents an incident angle of the ultrasonic wave in the fluid, $V_s$ represents velocity of the ultrasonic wave in the fluid, and K represents the flow rate correction coefficient.

$$Q=(1/K)\cdot(\pi d V_s^2/8 \tan\theta)\cdot\Delta t \qquad (1)$$

In the above Expression (1), the inner diameter d, the incident angle θ, the velocity $V_s$, and the flow rate correction coefficient K are fixed values set in the flow sensor 1 in advance.

Incidentally, depending on operation characteristics of the components of the head section 10 and the relay section 20, the relation of Expression (1) is not satisfied between the time difference calculated in the relay section 20 and the flow rate of the fluid flowing in the pipe P.

Therefore, in this embodiment, Expression (1) is corrected using the correction information explained above in order to accurately acquire a peculiar relation between the time difference calculated by the head section 10 and the relay section 20 and a flow rate that should be actually measured. That is, the main-body control section 302 corrects, using the correction information, the above Expression (1) serving as a predetermined relation between the measurement information and the flow rate of the fluid. An actual flow rate is calculated on the basis of a formula (a relation between the time difference and the flow rate) obtained by the correction. In this way, the correction information is information for correcting Expression (1) according to the head section 10 and the relay section 20. In this case, the correction information includes, for example, a value for adjusting a coefficient of the time difference Δt in Expression (1) and an offset value (an adjustment value with respect to a flow rate 0) that should be added to a term including the time difference Δt in Expression (1).

[3] Deformation of the Pipe P

In the following explanation, it is assumed that the relation of Expression (1) is satisfied between the time difference calculated in the relay section 20 and the flow rate of the fluid flowing in the pipe P.

When the cross section of the inner circumferential surface of the pipe P orthogonal to the axis of the pipe P is deformed from the perfect circle, it is likely that an accurate flow rate is not calculated because the inner diameter d of the pipe P changes. However, when the circumferential length of the cross section of the inner circumferential surface of the pipe P does not change and the cross section of the inner circumferential surface of the pipe P is deformed from the perfect circle into a regular even-numbered polygonal shape, it is possible to calculate a flow rate using the above Expression (1) even after the deformation of the pipe P on condition that the first and second ultrasonic elements 101 and 102 are disposed on the pipe P in a specific positional relation. A reason for this is explained.

The regular even-numbered polygonal shape is a regular polygonal shape, two sides opposed to each other of which are parallel. The regular even-numbered polygonal shape can be represented as a regular n-polygonal shape with n set to a multiple of 2. The specific positional relation between the first and second ultrasonic elements 101 and 102 refers to a positional relation in which the first and second ultrasonic elements 101 and 102 are respectively attached on two flat outer surfaces disposed side by side in parallel across the axis of the pipe P when the pipe P deformed from the cylindrical shape into a regular even-numbered square tube shape is viewed along the axis of the pipe P.

When the circumferential length of the cross section of the inner circumferential surface of the pipe P does not change and the cross section of the inner circumferential surface of the pipe P is deformed from the perfect circle into the regular n-polygonal shape (n is a multiple of 2), the following Expression (2) holds. In Expression (2), $S_1$ represents a sectional area of an internal space before the deformation of the pipe P and $S_2$ represents a sectional area of the internal space after the deformation of the pipe P.

$$S_2=[\pi/\{n\cdot\tan(\pi/n)\}]\cdot S_1 \qquad (2)$$

When the circumferential length of the cross section of the inner circumferential surface of the pipe P does not change and the cross section of the inner circumferential surface of the pipe P is deformed from the perfect circle into the regular n-polygonal shape (n is a multiple of 2), the following Expression (3) holds if it is assumed that a flow rate of the fluid flowing in the pipe P is fixed before and after the deformation. In Expression (3), $V_1$ represents velocity of the fluid flowing in the pipe P before the deformation of the pipe P and $V_2$ represents velocity of the fluid flowing in the pipe P after the deformation of the pipe P.

$$V_2=[\{n\cdot\tan(\pi/n)\}/\pi]\cdot V_1 \qquad (3)$$

The flow rate of the fluid flowing in the pipe P is a product of the inverse of the flow rate correction coefficient K, the sectional area of the internal space of the pipe P, and the velocity of the fluid flowing in the pipe P. According to the relations of the above Expressions (2) and (3), a product of the sectional area of the internal space of the pipe P and the velocity of the fluid flowing in the pipe P does not change before and after the deformation of the pipe P.

As explained above, in Expression (1), since the inner diameter d, the incident angle θ, the velocity $V_s$, and the flow rate correction coefficient K are treated as fixed values, the flow rate Q is determined by the time difference Δt. Therefore, when the cross section of the inner circumferential surface of the pipe P is deformed from the perfect circle into the regular even-numbered polygonal shape, that is, when the pipe P is deformed from the cylindrical shape into the regular even-numbered square tube shape, it is possible to calculate an accurate flow rate by using the above Expression (1) and the actually calculated time difference Δt even after the deformation of the pipe P.

In the pipe P formed of resin, creep deformation in which the resin is gradually deformed by continuous application of a load tends to occur. Therefore, in this embodiment, deformation of a portion where the head section 10 is attached in the pipe P is limited to deformation from the cylindrical shape into the regular even-numbered square tube shape. Consequently, even when the creep deformation occurs in the pipe P, it is possible to calculate an accurate flow rate using the above Expression (1).

The head fixing mechanism 13 shown in FIG. 1 includes clamp members for respectively fixing the elastic couplants CP1 and CP2 shown in FIG. 3 while pressing the elastic couplants CP1 and CP2 on the pipe P. In this embodiment, the clamp members of the head fixing mechanism 13 function as members for limiting the deformation of the pipe P to the deformation explained above.

Figure 4:
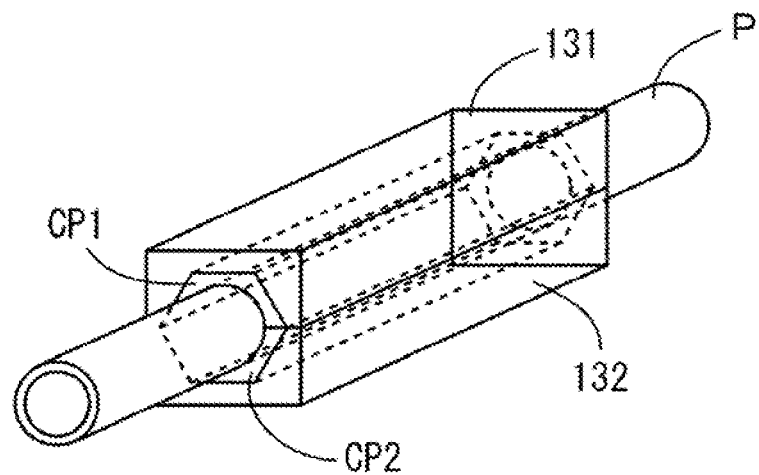
FIG. 4 is a perspective view for explaining a pipe deformation limiting function by clamp members of a head fixing mechanism.
Figure 5:
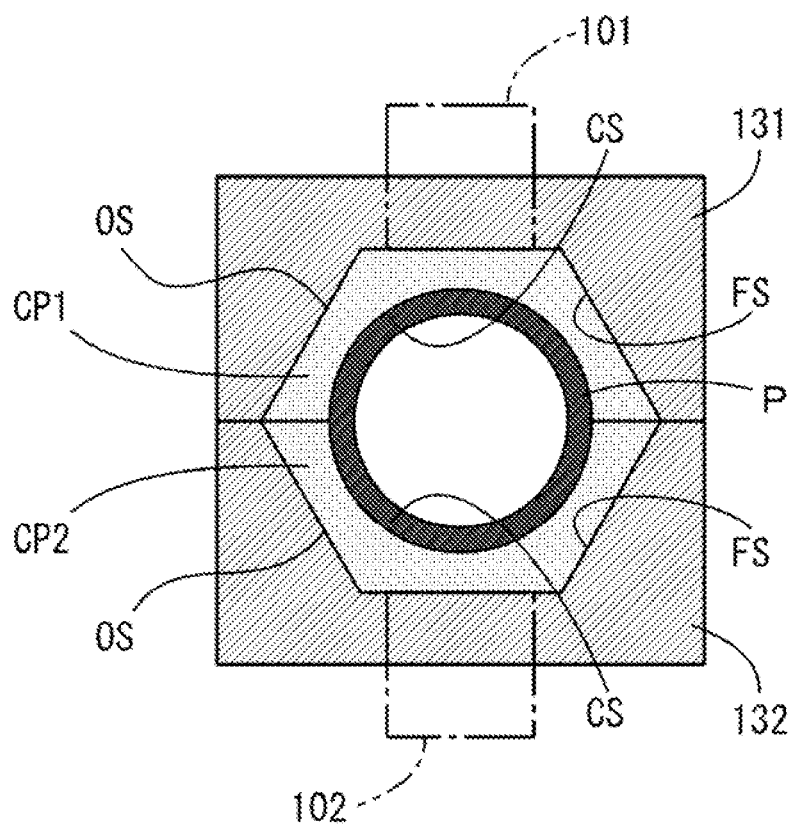
FIG. 5 is a sectional view of the clamp members and elastic couplants shown in FIG. 4 orthogonal to the axis of a pipe.
Figure 6:
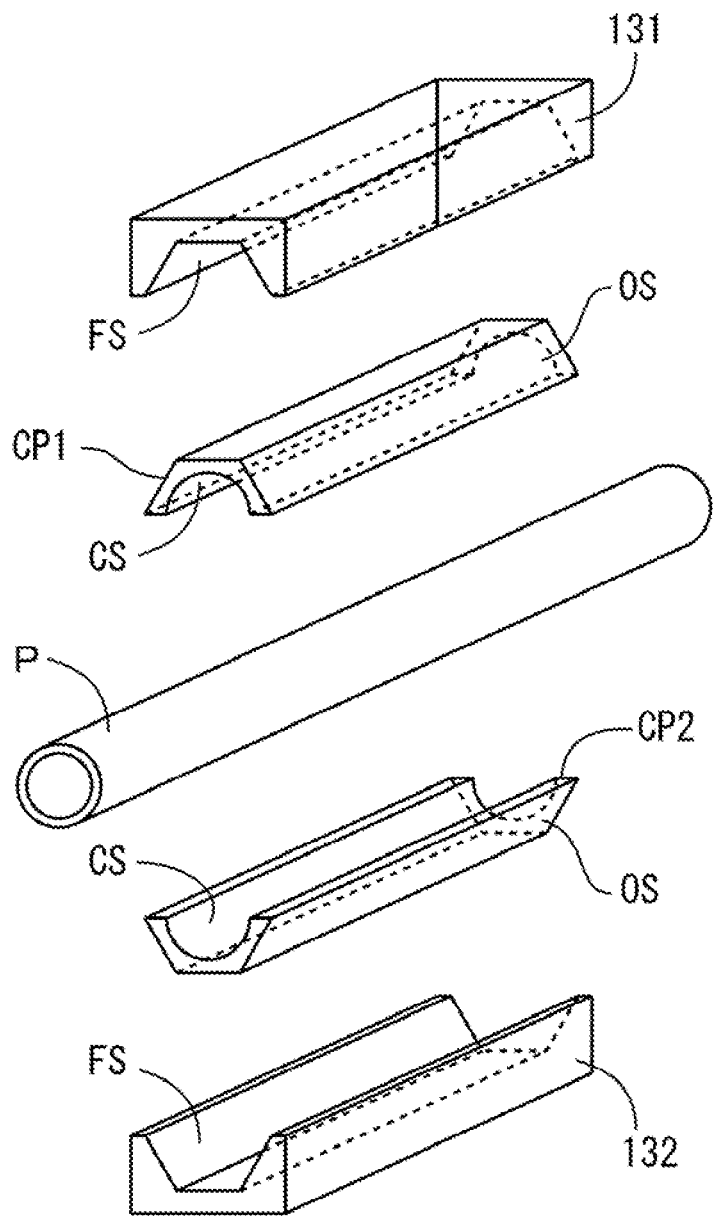
FIG. 6 is an exploded perspective view of the clamp members and the elastic couplants shown in FIG. 4.

FIG. 4 is a perspective view for explaining a deformation limiting function for the pipe P by the clamp members of the head fixing mechanism 13. FIG. 5 is a sectional view of clamp members 131 and 132 and the elastic couplants CP1 and CP2 shown in FIG. 4 orthogonal to the axis of the pipe P. FIG. 6 is an exploded perspective view of the clamp members 131 and 132 and the elastic couplants CP1 and CP2 shown in FIG. 4.

In FIGS. 4 to 6, the shapes of the clamp members 131 and 132 and the elastic couplants CP1 and CP2 are schematically shown in order to facilitate understanding of the deformation limiting function for the pipe P by the clamp members 131 and 132. In FIG. 5, a specific positional relation between the first and second ultrasonic elements 101 and 102 is indicated by an alternate long and short dashes line.

As shown in FIGS. 5 and 6, each of the elastic couplants CP1 and CP2 includes a contact surface CS and an outer surface OS facing opposite directions each other. The contact surface CS is a surface in contact with the outer circumferential surface of the pipe P. The outer surface OS is a surface facing the outward direction of the pipe P in a state in which the contact surface SC is in contact with the outer circumferential surface of the pipe P. The cross section of the contact surface CS orthogonal to the axis of the pipe P in the state in which the contact surface CS is in contact with the outer circumferential surface of the pipe P has an arcuate shape corresponding to the outer circumferential surface of the pipe P.

One elastic couplant CP1 is attached to the pipe P such that the contact surface CS of the elastic couplant CP1 is in contact with a half circumferential portion of the outer circumferential surface of the pipe P. The other elastic couplant CP2 is attached to the pipe P such that the contact surface CS of the elastic couplant CP2 is in contact with the remaining half circumferential portion of the outer circumferential surface of the pipe P. Consequently, the elastic couplants CP1 and CP2 surround the entire pipe P in the circumferential direction in a state in which the elastic couplants CP1 and CP2 are attached to the pipe P. In the circumferential direction of the pipe P, a gap may be formed between the two elastic couplants CP1 and CP2.

The clamp members 131 and 132 include fixing inner surfaces FS respectively in contact with the outer surfaces OS of the elastic couplants CP1 and CP2. The clamp member 131 is disposed such that the fixing inner surface FS is in contact with the outer surface OS of one elastic couplant CP1. The clamp member 132 is disposed such that the fixing inner surface FS is in contact with the outer surface OS of the other elastic couplant CP2. In this state, the two clamp members 131 and 132 are coupled to each other, whereby the fixing inner surfaces FS of the clamp members 131 and 132 press the elastic couplants CP1 and CP2 on the pipe P.

The fixing inner surfaces FS of the clamp members 131 and 132 are formed such that cross section orthogonal to the axis of the pipe P has a regular even-numbered polygonal shape (in this example, a regular hexagonal shape) in a state in which the clamp members 131 and 132 are coupled to each other to clamp the pipe P. In this case, in a plane orthogonal to the axis of the pipe P, a pressing force acts on the outer circumferential surface of the pipe P in a direction from sides of the fixing inner surfaces FS having the regular even-numbered polygonal shape toward the axis of the pipe P. Consequently, the deformation of the pipe P is limited to the deformation from the cylindrical shape into the regular even-numbered square tube shape.

As explained above, the fixing inner surfaces FS of the clamp members 131 and 132 shown in FIG. 6 are configured by a belt-like plurality of (in this example, three) planes extending in parallel to the axis of the pipe P. In this case, the outer surfaces OS of the elastic couplants CP1 and CP2 desirably have a belt-like plurality of planes respectively corresponding to the plurality of planes of the fixing inner surfaces FS. Consequently, in the plane orthogonal to the axis of the pipe P, a stable pressing force acts on the pipe P from the planes of the fixing inner surfaces FS of the clamp members 131 and 132. The outer surfaces OS of the elastic couplants CP1 and CP2 are not limited to the example explained above and may include curved surfaces corresponding to the outer circumferential surface of the pipe P.

In this embodiment, the cross section of the fixing inner surfaces FS of the clamp members 131 and 132 orthogonal to the axis of the pipe P only has to have a substantially regular even-numbered polygonal shape and may not have a perfect regular even-numbered polygonal shape. Specifically, the fixing inner surfaces FS of the clamp members 131 and 132 only have to be formed such that the cross section of the fixing inner surfaces FS has respective center portions of a plurality of sides of a regular even-numbered polygona shape.

Figure 7:
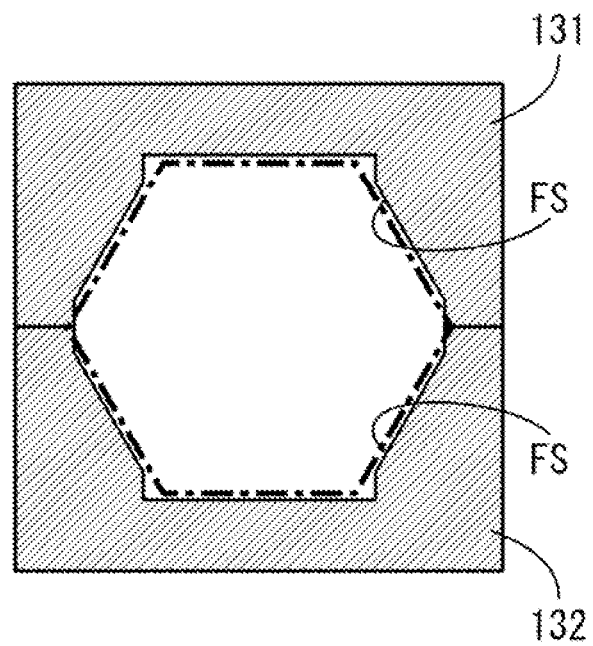
FIG. 7 is a schematic diagram showing another example of a cross section of clamp members coupled to each other.

FIG. 7 is a schematic diagram showing another example of the cross section of the clamp members 131 and 132 coupled to each other. In the example shown in FIG. 7, the cross section of the fixing inner surfaces FS of the clamp members 131 and 132 does not have a perfect regular even-numbered polygonal shape (in this example, a regular hexagonal shape) indicated by a thick alternate long and short dash line. However, the cross section of the fixing inner surfaces FS has the respective center portions of the plurality of sides of the regular even-numbered polygonal shape. Consequently, the clamp members 131 and 132 are attached to the pipe P together with the elastic couplants CP1 and CP2, whereby the deformation of the pipe P is limited to the deformation from the cylindrical shape to the regular even-numbered square tube shape.

In this embodiment, the outer surfaces OS of the elastic couplants CP1 and CP2 may be formed such that the entire outer surfaces OS are not in contact with the fixing inner surfaces FS of the clamp members 131 and 132. Gaps may be partially formed between the elastic couplants CP1 and CP2 and the clamp members 131 and 132.

Figure 8:
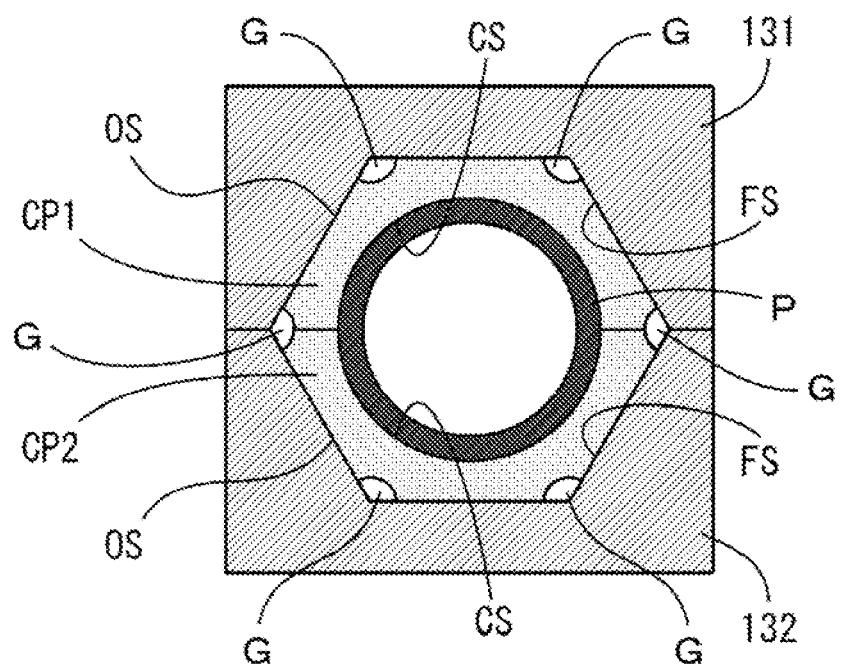
FIG. 8 is a sectional view showing an example of a configuration in which partial gaps are formed between the elastic couplants and the clamp members.

FIG. 8 is a sectional view showing an example of a configuration in which partial gaps are formed between the elastic couplants CP1 and CP2 and the clamp members 131 and 132. In the example shown in FIG. 8, gaps G are formed between vertex portions in the cross section of the fixing inner surfaces FS having the regular even-numbered polygonal shape and the outer surfaces OS of the elastic couplants CP1 and CP2. Even in this case, in the plane orthogonal to the axis of the pipe P, the outer surfaces OS of the elastic couplants CP1 and CP2 are in contact with the respective center portions of the plurality of sides of the regular even-numbered polygonal shape of the fixing inner surfaces FS. Consequently, the deformation of the pipe P is limited to the deformation from the cylindrical shape into the regular even-numbered square tube shape.

In this case, dimension errors and assembly errors of the pipe P and the clamp members 131 and 132 are easily absorbed by the gaps G and elastic forces of the elastic couplants CP1 and CP2. Therefore, groove sections for forming the gaps G between the fixing inner surfaces FS and the outer surfaces OS are desirably formed on at least one of the fixing inner surfaces FS and the outer surfaces OS.

Even when Expression (1) is corrected according to the correction information without being limited to the example explained above, when the deformation of the pipe P is limited to the deformation from the cylindrical shape into the regular even-numbered square tube shape, an accurate flow rate can be calculated using Expression (1) after the correction according to the correction information before and after the deformation. This is because the correction information is decided according to the configurations of the head section 10 and the relay section and is not information that changes according to the deformation of the pipe P.

[4] Specific Internal Structure of the Head Section 10

Figure 9:
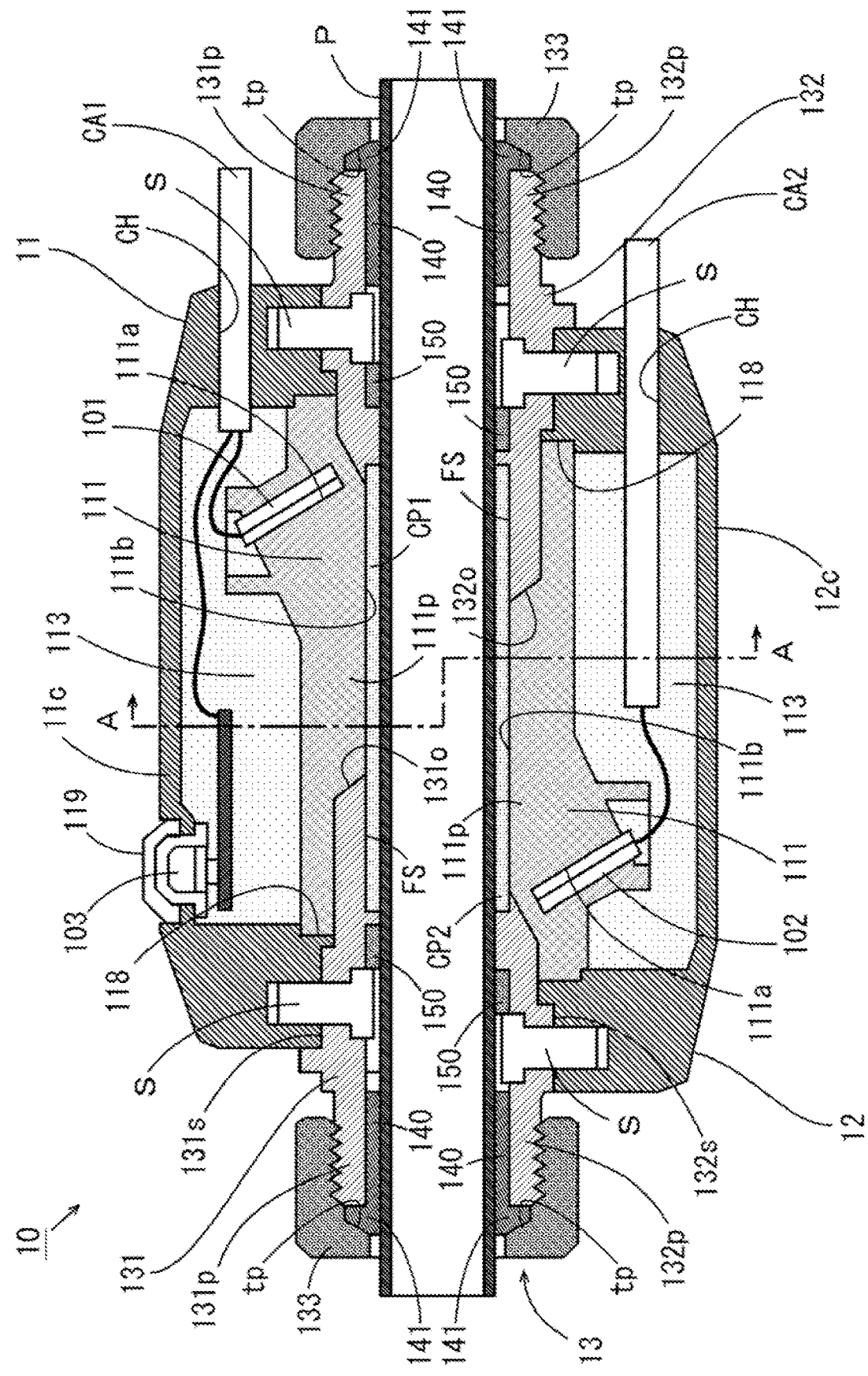
FIG. 9 is a sectional view of a head section shown in FIG. 1 parallel to the axis of the pipe.
Figure 10:
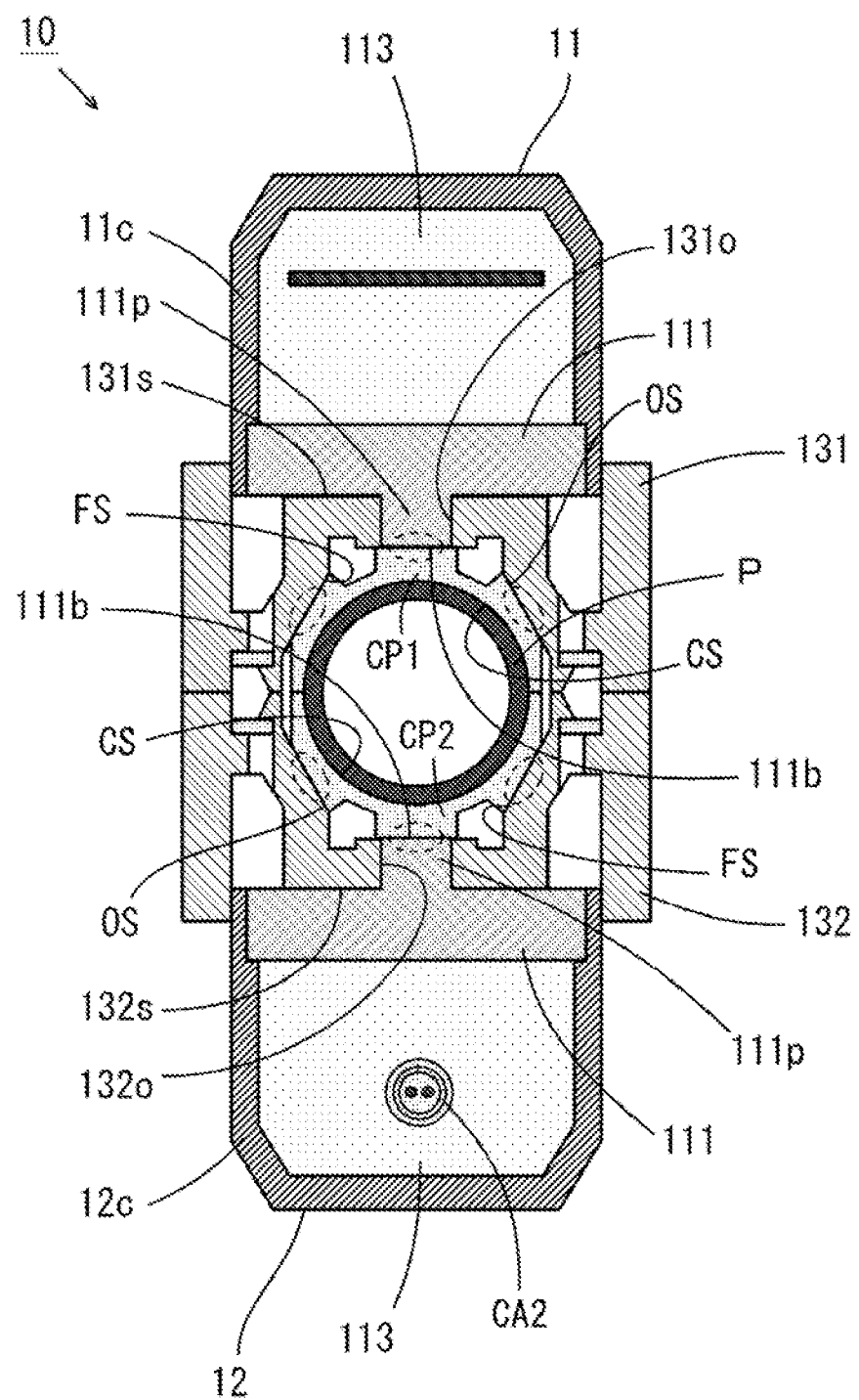
FIG. 10 is a sectional view taken along an A-A line of the head section shown in FIG. 9.

FIG. 9 is a sectional view of the head section 10 shown in FIG. 1 parallel to the axis of the pipe P. FIG. 10 is a sectional view taken along an A-A line of the head section 10 shown in FIG. 9. The sectional view of FIG. 9 corresponds to the schematic sectional view of FIG. 3. Scales of FIGS. 9 and 10 are different from each other.

As shown in FIG. 9, the first head section 11 includes a casing 11c, the first ultrasonic element 101, the display lamp 103, and the wedge material 111. The casing 11c is formed of resin and has an elongated shape (in this example, a substantially rectangular parallelepiped shape) extending in one direction.

In the respective members attached to the pipe P, a direction facing the axis of the pipe P (a direction approaching the axis of the pipe P) is referred to as inward direction. The opposite direction of the inward direction (a direction separating from the axis of the pipe P) is referred to as outward direction.

A window section 119 formed by a transparent member is formed at the outer-side end portion of the casing 11c facing the outward direction. The transparent member is formed of, for example, resin. The display lamp 103 is disposed in a position close to the window section 119 on the inside of the casing 11c. In this state, the display lamp 103 is visually recognizable by the user from the outside of the casing 11c through the window section 119.

At the inner-side end portion of the casing 11c facing the inward direction, an opening 118 that causes an internal space of the casing 11c and an external space of the casing 11c to communicate is formed. The wedge material 111 is attached to the inner-side end portion of the casing 11c to close the opening 118. Consequently, a space into which liquid such as water and oil cannot intrude is formed on the inside of the casing 11c.

A joining surface 111a facing an oblique outward direction is formed in an outer-side portion of the wedge material 111. A projecting section 111p projecting to the inward direction from the inner-side end portion of the casing 11c in a closed state of the opening 118 is formed in an inner-side portion of the wedge material 111. A flat incident/emitting surface 111b facing the inward direction is formed at the distal end of the projecting section 111p.

A cable insertion hole CH is formed at one end portion in the longitudinal direction of the casing 11c. One end of the first head cable CA1 is inserted into the cable insertion hole CH. The first head cable CA1 has a configuration in which a shield cable and a non-shield cable are bound. More specifically, the shield cable configuring a part of the first head cable CA1 includes twisted pair core wires connected to the first ultrasonic element 101 and a shield layer covering the twisted pair core wires. On the other hand, the non-shield cable configuring another portion of the first head cable CA1 includes one or a plurality of core wires connected to the display lamp 103 and does not include a shield layer.

A resin member 113 is filled in the casing 11c such that an electric connection point of the first head cable CA1 and the first ultrasonic element 101 and an electric connection point of the first head cable CA1 and the display lamp 103 are embedded in the resin member 113. Consequently, the electric connection points of the first head cable CA1 and the first ultrasonic element 101 and the display lamp 103 are protected by the resin member 113. Consequently, deterioration of the connection points is prevented. Reliability of the flow sensor 1 is improved and extension of the life of the flow sensor 1 is realized.

The second head section 12 includes a casing 12c, the second ultrasonic element 102, and the wedge material 111. The second head section 12 has the same configuration as the configuration of the first head section 11 except that the second head section 12 does not include the display lamp 103, the window section 119 is not provided in the casing 12c, and the direction of the wedge material 111 attached to the casing 12c is opposite concerning the longitudinal direction of the casing 12c.

One end of the second head cable CA2 is inserted into the cable insertion hole CH of the casing 12c. The second head cable CA2 is configured by a shield cable. More specifically, the shield cable configuring the second head cable CA2 includes twisted pair core wires connected to the second ultrasonic element 102 and a shield layer covering the twisted pair core wires. As in the internal configuration of the first head section 11, the resin member 113 is filled in the casing 12c such that an electric connection point of the second head cable CA2 and the second ultrasonic element 102 is embedded in the resin member 113.

The head fixing mechanism 13 includes the clamp members 131 and 132, the elastic couplants CP1 and CP2, a plurality of (in this example, two) nut members 133, a plurality of (in this example, four) gland nut rubbers 140, and a plurality of (in this example, four) temporary fixing rubbers 150.

The clamp members 131 and 132 have the same shape and are formed of carbon reinforced resin. The elastic couplants CP1 and CP2, the two gland nut rubbers 140, and the two temporary fixing rubbers 150 are connected to the clamp members 131 and 132 in advance using, for example, an adhesive. The clamp members 131 and 132 may be formed of normal resin not including a reinforcing agent.

Figure 11:
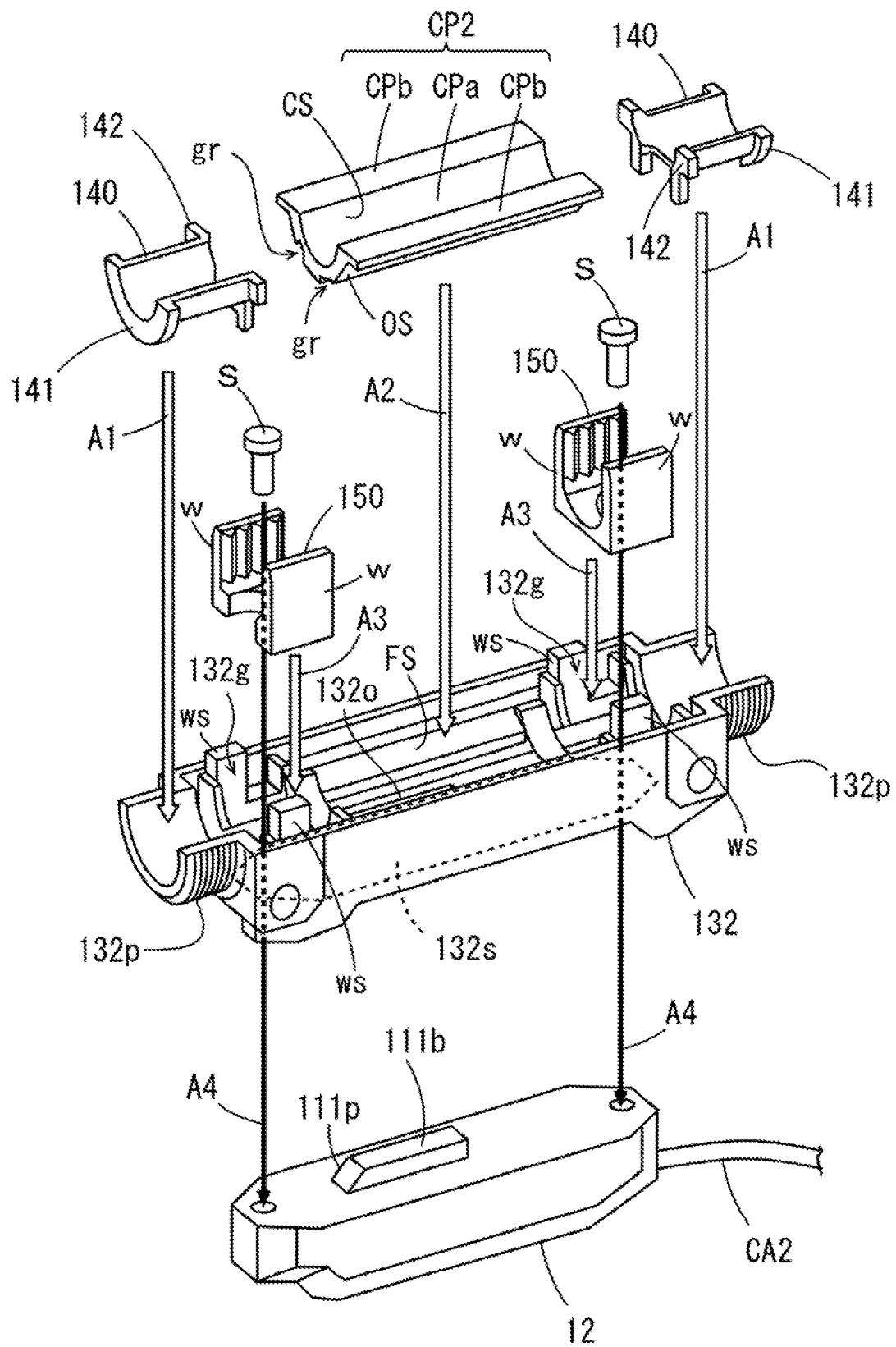
FIG. 11 is an exploded perspective view showing one clamp member of a head fixing mechanism shown in FIG. 9 and a plurality of members connected to the clamp member.

A connection state of the components in one clamp member 132 representing the clamp members 131 and 132 is explained. FIG. 11 is an exploded perspective view showing one clamp member 132 in the head fixing mechanism 13 shown in FIG. 9 and a plurality of members connected to the clamp member 132.

As shown in FIG. 11, the clamp member 132 has an elongated shape extending longer than the second head section 12. At both end portions of the clamp member 132, coupling sections 132p having a semi-cylindrical shape and extending in the longitudinal direction of the clamp member 132 are respectively formed. Threading is applied to the outer circumferential surfaces of the coupling sections 132p. As indicated by white arrows A1 in FIG. 11, the gland nut rubbers 140 having a substantially semi-cylindrical shape are attached on the inner circumferential surfaces of the coupling sections 132p. Flange sections 141 and 142 are formed at both end portions of the gland nut rubbers 140. One flange sections 141 of the flange sections 141 and 142 have a semi-ring shape and are disposed in the outward direction of the coupling sections 132p in the longitudinal direction of the clamp member 132.

The fixing inner surface FS facing the inward direction is formed in substantially the center of the clamp member 132. As indicated by a white arrow A2 in FIG. 11, the elastic couplant CP2 is attached on the fixing inner surface FS. The elastic couplant CP2 in this example includes an ultrasonic-wave transmitting section CPa having a substantially semi-cylindrical shape and two flange sections CPb. The two flange sections CPb are formed to extend a fixed distance in directions away from each other from both end portions in the circumferential direction of the ultrasonic-wave transmitting section CPa. The ultrasonic-wave transmitting section CPa of the elastic couplant CP2 includes the contact surface CS and the outer surface OS explained above. Groove sections gr for forming the gaps G (FIG. 8) between the outer surface OS of the elastic couplant CP2 and the fixing inner surface FS of the clamp member 132 are formed on the outer surface OS of the elastic couplant CP2. In a state in which the elastic couplant CP2 is attached to the clamp member 132, the fixing inner surface FS of the clamp member 132 comes into contact with a portion excluding the groove sections gr in the outer surface OS of the elastic couplant CP2.

An opening 132o for bringing the incident/emitting surface 111b of the second head section 12 into contact with a part of the outer surface OS of the elastic couplant CP2 is formed in a portion of the clamp member 132 forming the fixing inner surface FS.

Rubber fitting sections 132g are respectively formed in portions between the fixing inner surface FS and one coupling section 132p and between the fixing inner surface FS and the other coupling section 132p in the clamp member 132. Each of the rubber fitting sections 132g includes two supporting pieces ws formed to be opposed to each other at a fixed distance in the latitudinal direction of the clamp member 132. As indicated by a white arrow A3 in FIG. 11, the temporary fixing rubber 150 having a substantially U-shaped cross section is fit in between the two supporting pieces ws of the rubber fitting section 132g.

A holding surface 132s is formed in an outer side portion of the clamp member 132 facing the outward direction of the pipe P in a state in which the clamp member 132 is attached to the pipe P. In a state in which the second head section 12 is disposed on the holding surface 132s, as indicated by thick arrows A4 in FIG. 11, the clamp member 132 and the second head section 12 are connected using two screws S. At this time, the heads of the two screws S are located in the inward direction of the clamp member 132. The projecting section 111p of the second head section 12 is inserted into the opening 132o of the clamp member 132. In this state, the incident/emitting surface 111b of the distal end of the projecting section 111p is flush with the fixing inner surface FS of the clamp member 132 (see FIGS. 9 and 10). Consequently, the incident/emitting surface 111b of the second head section 12 is in contact with the outer surface OS of the elastic couplant CP2. In this case, the incident/emitting surface 111b functions as a transmission route of an ultrasonic wave and functions as a part of the fixing inner surface FS to fix the elastic couplant CP2 while pressing the elastic couplant CP2 on the pipe P.

As explained above, the second head section 12 is held by the clamp member 132. Consequently, a component including the second head section 12 and the clamp member 132 can be treated integrally with the pipe P.

Each of the temporary fixing rubber 150 includes two wall sections w opposed to each other. In a state in which the temporary fixing rubber 150 is fit in the rubber fitting section 132g, the two wall sections w are supported by the two supporting pieces ws of the rubber fitting section 132g. At this time, an interval between the two wall sections w of the temporary fixing rubber 150 is slightly smaller than the outer diameter of the pipe P. Consequently, when the second head section 12 is attached to the pipe P, the pipe P can be easily inserted between the two wall sections w of each of the temporary fixing rubbers 150.

Figure 12:
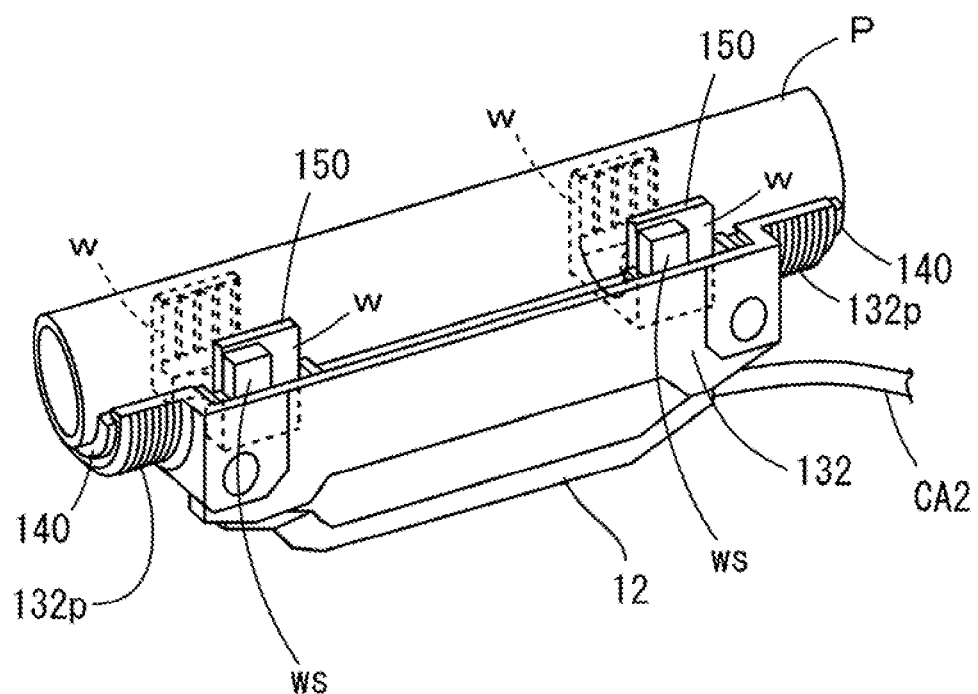
FIG. 12 is an exterior perspective view showing a state in which the clamp member is temporarily fixed to the pipe by temporary fixing rubber.

FIG. 12 is an exterior perspective view showing a state in which the clamp member 132 is temporarily fixed to the pipe P by the temporary fixing rubbers 150. As shown in FIG. 12, the pipe P is inserted respectively between the two wall sections w of each of the two temporary fixing rubbers 150, whereby the temporary fixing rubbers 150 clamp the pipe P. Consequently, the clamp member 132 is temporarily fixed to the pipe P by an elastic force of the two temporary fixing rubbers 150.

As explained above, the clamp member 131 has the same shape as the shape of the clamp member 132. Like the clamp member 132, the elastic couplant CP1, the two gland nut rubbers 140, and the two temporary fixing rubbers 150 are connected to the clamp member 131. A holding surface 131s (FIG. 9) is formed in the outer-side portion of the clamp member 131. In a state in which the first head section 11 is disposed on the holding surface 131s, the clamp member 131 and the first head section 11 are connected using the two screws S. Consequently, a component including the first head section 11 and the clamp member 131 can be treated integrally with the pipe P.

Figure 13:
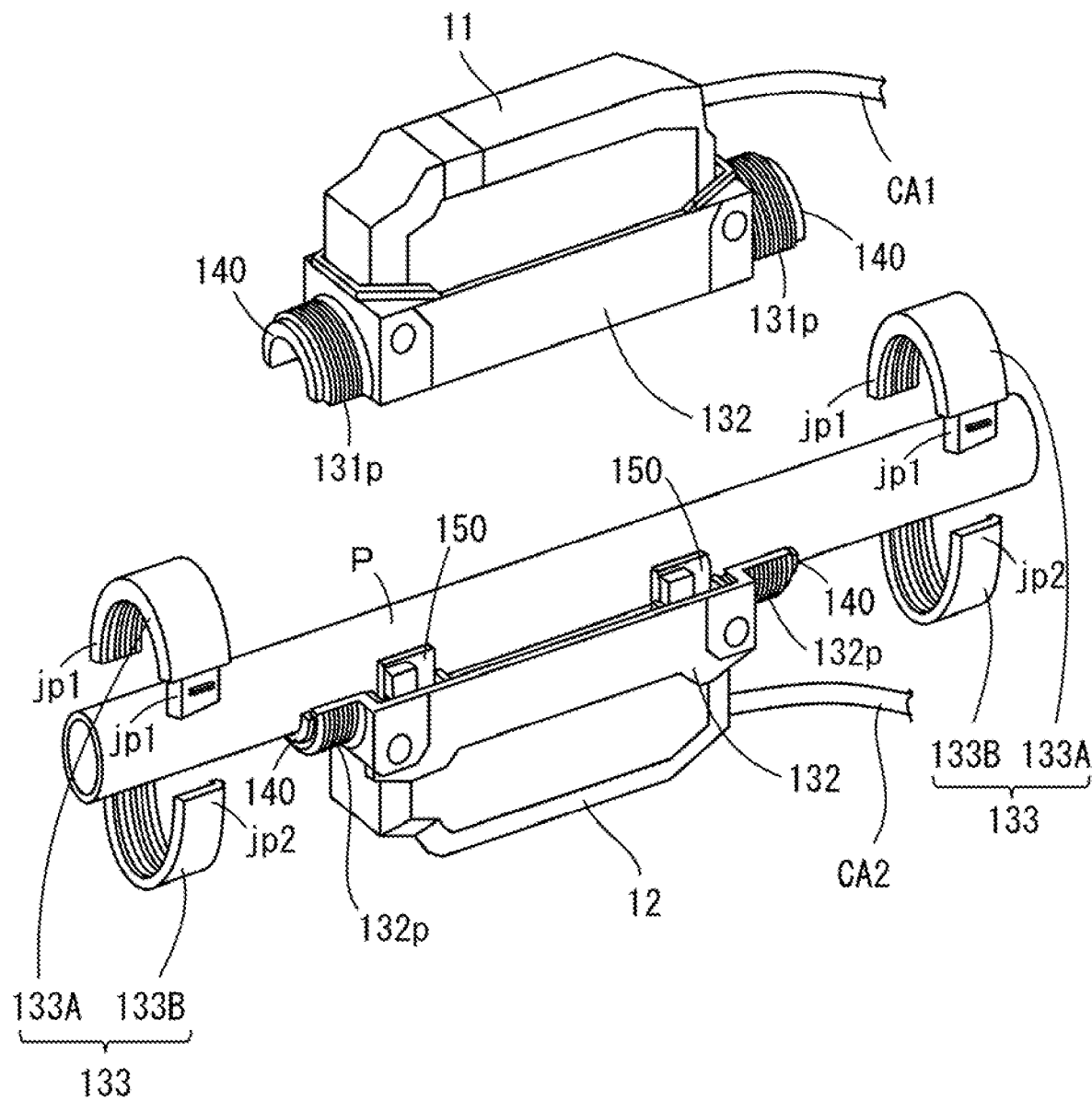
FIG. 13 is an exterior perspective view for explaining coupling of two clamp members for attaching the head section to the pipe.

FIG. 13 is an exterior perspective view for explaining coupling of the two clamp members 131 and 132 for attaching the head section 10 to the pipe P. As shown in FIG. 13, when the clamp members 131 and 132 are coupled, first, the two clamp members 131 and 132 are respectively temporarily fixed to the pipe P to clamp the pipe P.

In this state, the clamp members 131 and 132 are aligned to be accurately opposed to each other across the pipe P. According to the alignment, a coupling section 131p formed at one end portion of the clamp member 131 and the coupling section 132p formed at one end portion of the clamp member 132 form one male screw (hollow screw). The coupling section 131p formed at the other end portion of the clamp member 131 and the coupling section 132p formed at the other end portion of the clamp member 132 form one male screw (hollow screw). Thereafter, the nut members 133 are fastened to the male screws formed by the coupling sections 131p and 132p disposed to be opposed to each other. Consequently, the clamp members 131 and 132 are coupled.

As shown in FIG. 9, taper sections tp, the inner diameter of which continuously changes, are formed on the inner circumferential surfaces of the nut members 133. When the nut members 133 are fastened to the coupling sections 131p and 132p, the taper sections tp press the flange sections 141 of the gland nut rubbers 140 toward the outer circumferential surface of the pipe P and the end portions the coupling sections 131p and 132p. Consequently, the flange sections 141 of the gland nut rubbers 140 are crushed among the taper sections tp, the coupling sections 131p and 132p, and the outer circumferential surface of the pipe P. At this time, a strong retaining force is generated among the nut members 133, the coupling sections 131p and 132p, and the pipe P by an elastic force of the crushed flange sections 141.

The nut members 133 are formed of carbon reinforced resin. As shown in FIG. 13, each of the nut members 133 is formed by two members 133A and 133B. The nut members 133 may be formed of normal resin that is not reinforced.

The two members 133A and 133B have a substantially semi-cylindrical shape slightly larger than the coupling sections 131p and 132p of the clamp members 131 and 132. Threading is applied to the inner circumferential surfaces of the members 133A and 133B. Both end portions jp1 in the circumferential direction of one members 133A are configured to be connectable to and detachable from both end portions jp2 in the circumferential direction of the other members 133B. Consequently, the clamp members 131 and 132 can be coupled with a simple configuration without cutting the pipe P.

In a state in which the head section 10 is attached to the pipe P, as shown in FIG. 10, the elastic couplant CP1 is pressed against the outer circumferential surface of the pipe P and fixed by the fixing inner surface FS of the clamp member 131 and the incident/emitting surface 111b of the first head section 11. The elastic couplant CP2 is pressed against the outer circumferential surface of the pipe P and fixed by the fixing inner surface FS of the clamp member 132 and the incident/emitting surface 111b of the second head section 12.

A cross section of a surface formed by the fixing inner surfaces FS formed by the clamp members 131 and 132 and the incident/emitting surfaces 111b of the first and second head sections 11 and 12 in this example has a substantially regular even-numbered polygonal shape, which is not a perfect regular even-numbered polygonal shape, as in the example shown in FIG. 8. However, the cross section of the surface formed by the fixing inner surfaces FS of the clamp members 131 and 132 and the incident/emitting surfaces 111b of the first and second head sections 11 and 12 have respective center portions of a plurality of sides of the regular even-numbered polygonal shape as indicated by dotted lines in FIG. 10. Consequently, the deformation of the pipe P is limited to the deformation from the cylindrical shape into the regular even-numbered square tube shape.

[5] Effects (a) In the flow sensor 1 according to this embodiment, the cross section of the fixing inner surfaces FS of the clamp members 131 and 132 has the shape of the substantially regular even-numbered polygonal shape centering on the axis of the pipe P. Therefore, the deformation of the pipe P is limited to the deformation from the cylindrical shape to the regular even-numbered square tube shape. In this case, even when the pipe P is deformed, it is possible to calculate, without changing the calculation method, an accurate flow rate on the basis of the time difference between the propagation time of the ultrasonic wave transmitted from the first ultrasonic element 101 and the second ultrasonic element 102 and the propagation time of the ultrasonic wave transmitted from the second ultrasonic element 102 to the first ultrasonic element 101. Therefore, it is possible to prevent deterioration in measurement accuracy of a flow rate due to the deformation of the pipe P.

(b) The cross section of the contact surface CS orthogonal to the axis of the pipe P in the state in which the contact surfaces CS of the elastic couplants CP1 and CP2 are in contact with the outer circumferential surface of the pipe P has the arcuate shape. Consequently, it is easy to attach the head section 10 to the pipe P.

(c) In the head section 10 explained above, the elastic couplants CP1 and CP2 are respectively attached to the clamp members 131 and 132 separated from each other. The clamp members 131 and 132 are coupled to clamp the pipe P. Consequently, it is possible to easily attach the head section 10 to the existing pipe P without cutting the pipe P.

(d) The clamp members 131 and 132 according to this embodiment are formed of the carbon reinforced resin. In this case, since the strength of the clamp members 131 and 132 is secured, an attachment state of the head section 10 to the pipe P is stabilized and deformation of the clamp members 131 and 132 is prevented. Corrosion resistance of the clamp members 131 and 132 is improved.

(e) The outer surface of the head section 10 explained above is formed by the casings 11c and 12c, the window section 119, the clamp members 131 and 132, and the nut members 133. Since these members are formed of resin, components including metal materials are not exposed in the head section 10. Therefore, environment resistance of the head section 10 is improved.

[6] Other Embodiments (a) In the embodiment explained above, the fixing inner surface FS having the regular hexagonal cross section is shown in FIG. 5 as the example of the shape of the fixing inner surface FS having the regular even-numbered polygonal shape. However, the present invention is not limited to this. The sectional shape of the fixing inner surface FS may have a regular square shape or may have a regular octagonal shape besides the regular hexagonal shape.

(b) In the embodiment explained above, the outer circumferential surface of the pipe P is surrounded by the two elastic couplants CP1 and CP2 separated from each other. However, the present invention is not limited to this. A single elastic couplant formed to surround the entire circumference or substantially the entire circumference of the pipe P may be used instead of using the elastic couplants CP1 and CP2 separated from each other.

(c) In the embodiment explained above, the pipe P to which the head section 10 is attached is the resin pipe. However, the present invention is not limited to this. The pipe P may be a metal pipe.

(d) In the embodiment explained above, the two clamp members 131 and 132 are coupled using the male screws (the hollow screws) formed at both the end portions thereof and the nut members 133. However, the present invention is not limited to this. The clamp members 131 and 132 may be coupled to each other using a rubber band, a clamping band, or the like.

(e) In the embodiment explained above, the first head section 11 and the second head section 12 are provided in so-called Z-type disposition. However, the present invention is not limited to this. The first head section 11 and the second head section 12 may be provided in disposition in which the first head section 11 and the second head section 12 are disposed side by side in the extending direction of the pipe P (so-called V-type disposition). In this case, as in the example explained above, an elastic couplant is provided to surround the pipe P. The elastic couplant is fixed to the pipe P by the two clamp members 131 and 132. Consequently, the same effects as the effects in the embodiment can be obtained.

In the V-type disposition, an ultrasonic wave transmitted by the first ultrasonic element 101 is made incident on the fluid in the pipe P at the incident angle $\theta$ and thereafter reflected by the inner surface of the pipe P at a reflection angle $\theta$ and received by the second ultrasonic element 102. Similarly, an ultrasonic wave transmitted by the second ultrasonic element 102 is made incident on the fluid in the pipe P at the incident angle $\theta$ and thereafter reflected by the inner surface of the pipe P at the reflection angle $\theta$ and received by the first ultrasonic element 101.

In this case, the flow rate Q of the fluid flowing in the pipe P is calculated on the basis of Expression (4) described below. In Expression (4), $\Delta t$ represents the time difference calculated in the relay section 20, d represents the inner diameter of the pipe P, $\theta$ represents the incident angle of the ultrasonic wave in the fluid, $V_s$ represents the velocity of the ultrasonic wave in the fluid, and K represents the flow rate correction coefficient.

$$Q=(1/K)\cdot(\pi dV_s^2/16 \tan \theta)\cdot\Delta t \quad (4)$$

In this case, as in the example of the calculation method for a flow rate in the embodiment explained above, by correcting Expression (4), it is possible to calculate an accurate flow rate using a formula after the correction.

(f) In the embodiment explained above, the cross section of the contact surfaces CS of the elastic couplants CP1 and CP2 has the substantially arcuate shape corresponding to the outer circumferential surface of the pipe P. However, the present invention is not limited to this. The cross section of the contact surfaces CS of the elastic couplants CP1 and CP2 may have a regular polygonal shape corresponding to the outer circumferential surface of the pipe P in a state in which the elastic couplants CP1 and CP2 are in a state of a positional relation at the time when the elastic couplants CP1 and CP2 are attached to the pipe P. The regular polygonal shape corresponding to the outer circumferential surface of the pipe P is a regular polygonal shape approximate to the sectional shape of the outer circumferential surface of the pipe P. For example, the regular polygonal shape refers to a regular polygonal shape in which the length of a straight line connecting opposed two vertexes through the center is equal to the outer diameter of the pipe P or close to the outer diameter.

Figure 14A:
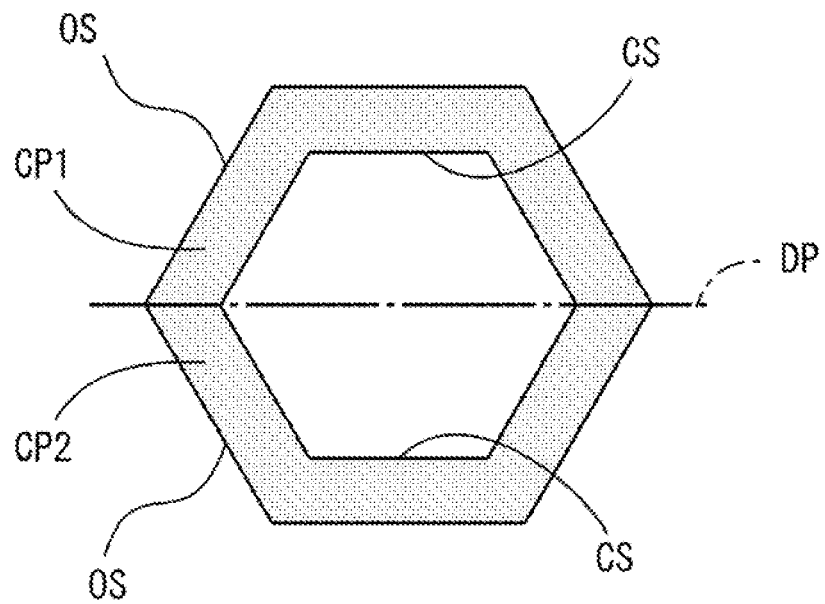
FIGS. 14A and 14B are schematic sectional views showing an example and another example of elastic couplants according to another embodiment.
Figure 14B:
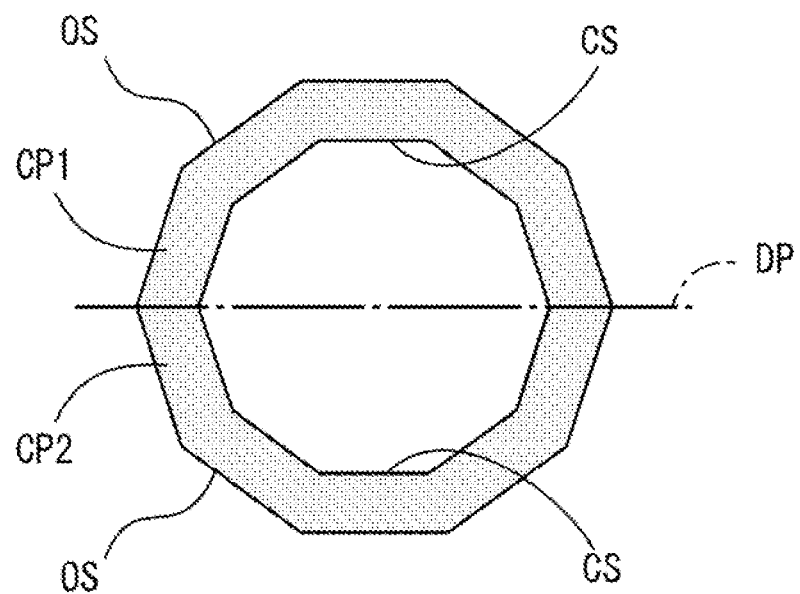

FIGS. 14A and 14B are schematic sectional views showing an example and another example of an elastic couplant according to another embodiment. In the example shown in FIG. 14A, the cross section of the contact surfaces CS of the elastic couplants CP1 and CP2 has a regular hexagonal shape corresponding to the outer circumferential surface of the pipe P in a state in which the elastic couplants CP1 and CP2 are in a positional relation at the time when the elastic couplants CP1 and CP2 are attached to the pipe P. In the example shown in FIG. 14B, the cross section of the contact surfaces CS of the elastic couplants CP1 and CP2 has a regular decagonal shape corresponding to the outer circumferential surface of the pipe P in the state in which the elastic couplants CP1 and CP2 are in the positional relation at the time when the elastic couplants CP1 and CP2 are attached to the pipe P.

As explained above, when the cross section of the contact surfaces CS is formed in a regular polygonal shape corresponding to the outer circumferential surface of the pipe P, as shown in FIGS. 14A and 14B, the elastic couplants CP1 and CP2 are desirably configured to be divided by an imaginary division surface DP that includes a straight line passing two vertexes opposed to each other of the regular polygonal shape and the center of the regular polygonal shape and is parallel to the axis of the pipe P.

In this case, the contact surfaces CS of the elastic couplants CP1 and CP2 have both end portions inclining with respect to the imaginary division surface DP in the cross section orthogonal to the axis of the pipe P. Consequently, it is possible to easily guide the pipe P to appropriate positions on the contact surfaces CS of the elastic couplants CP1 and CP2. Therefore, it is easy to attach the elastic couplants CP1 and CP2 to the pipe P having flexibility.

[7] Correspondence Relation Between the Constituent Elements of the Claims and the Sections in the Embodiment An example of correspondence between the constituent elements of the claims and the sections in the embodiment is explained bellow. However, the present invention is not limited to the example explained below.

In the embodiment, the pipe P is an example of the pipe. The flow sensor 1 is an example of the clamp-on type ultrasonic flow sensor. The first ultrasonic element 101 is an example of the first ultrasonic element. The second ultrasonic element 102 is an example of the second ultrasonic element. The elastic couplants CP1 and CP2 are examples of the elastic couplant. The clamp members 131 and 132 are examples of the fixing member. The relay control section 206 and the main-body control section 302 are examples of the flow-rate calculating section. The fixing inner surface FS is an example of the fixing inner surface.

The contact surfaces CS of the elastic couplants CP1 and CP2 are examples of the acoustic contact surface. The elastic couplant CP1 is an example of the first elastic couplant. The elastic couplant CP2 is an example of the second elastic couplant. The clamp member 131 is an example of the first attachment member. The clamp member 132 is an example of the second attachment member. The nut member 133 is an example of the coupling member and the fastening member.

The coupling section 131*p* of the clamp member 131 is an example of the first coupling portion. The coupling section 132*p* of the clamp member 132 is an example of the second coupling portion. The one male screw formed by the coupling sections 131*p* and 132*p* is an example of the fastened section. The member 133A of the nut member 133 is an example of the first member. The member 133B of the nut member 133 is an example of the second member.

The temporary fixing rubber 150 is an example of the elastic member. The holding surface 131*s* of the clamp member 131 is an example of the first element holding section. The holding surface 132*s* of the clamp member 132 is an example of the second element holding section.

As the constituent elements of the claims, other various elements having the configurations or the functions described in the claims can also be used.

What is claimed is:

1. A clamp-on type ultrasonic flow sensor that measures a flow rate of fluid flowing in a pipe, the clamp-on type ultrasonic flow sensor comprising:
    a first ultrasonic element transmitting and receiving an ultrasonic wave;
    a first wedge coupled to the first ultrasonic element, configured to propagate the ultrasonic wave transmitted from and received by the first ultrasonic element;
    a second ultrasonic element transmitting and receiving an ultrasonic wave;
    a second wedge coupled to the second ultrasonic element, configured to propagate the ultrasonic wave transmitted from and received by the second ultrasonic element;
    a solid elastic couplant coupled to the first wedge and the second wedge, configured to transmit the ultrasonic wave transmitted, via the first wedge, from the first ultrasonic element to the pipe and configured to transmit the ultrasonic wave transmitted, via the second wedge, from the second ultrasonic element to the pipe;
    a fixing member coupled to the solid elastic couplant, configured to fix the elastic couplant while pressing the elastic couplant on the pipe; and
    a flow-rate calculating section configured to calculate a flow rate of the fluid flowing in the pipe on the basis of a difference between a propagation time of the ultrasonic wave transmitted from the first ultrasonic element to the second ultrasonic element and a propagation time of the ultrasonic wave transmitted from the second ultrasonic element to the first ultrasonic element, wherein the elastic couplant is formed to surround an outer circumferential surface of the pipe, the fixing member is formed to surround an outer circumferential surface of the elastic couplant and includes a fixing inner surface in contact with the elastic couplant, and in a cross section of the fixing member orthogonal to an axis of the pipe, the fixing inner surface has a regular polygonal shape that centers on the axis of the pipe and, opposed two sides of which are parallel.

2. The clamp-on type ultrasonic flow sensor according to claim 1, wherein the elastic couplant includes an acoustic contact surface that is in contact with the outer circumferential surface of the pipe in order to transmit the ultrasonic wave between the first and second ultrasonic elements and the pipe, and a cross section of the acoustic contact surface orthogonal to the axis of the pipe in a state in which the acoustic contact surface is in contact with the outer circumferential surface of the pipe has a shape corresponding to the outer circumferential surface of the pipe.

3. The clamp-on type ultrasonic flow sensor according to claim 1, wherein the elastic couplant includes:

a first elastic couplant provided to be in contact with a portion in a circumferential direction of the outer circumferential surface of the pipe; and a second elastic couplant provided to be in contact with another portion in the circumferential direction of the outer circumferential surface of the pipe, the fixing member includes:

a first attachment member configured to press the first elastic couplant on the pipe;

a second attachment member configured to press the second elastic couplant on the pipe; and a coupling member configured to couple the first attachment member and the second attachment member.

4. The clamp-on type ultrasonic flow sensor according to claim 3, wherein the first attachment member includes a first coupling portion having a semi-cylindrical shape, the second attachment member includes a second coupling portion having a semi-cylindrical shape, the first and second coupling portions form one fastened section having a cylindrical shape when inner surfaces of the first and second coupling portions are disposed to be opposed to each other in a state in which the first and second attachment members are attached to the pipe, and the coupling member is a fastening member formed to be fastenable to the one fastened section.

5. The clamp-on type ultrasonic flow sensor according to claim 4, wherein the fastening member includes first and second members, and the first and second members are configured to be connectable to each other to clamp the pipe and detachable from each other.

6. The clamp-on type ultrasonic flow sensor according to claim 3, further comprising an elastic member attached to at least one of the first and second attachment members, wherein the elastic member is configured to clamp the pipe to thereby fix at least one attachment member to the pipe.

7. The clamp-on type ultrasonic flow sensor according to claim 3, wherein the first attachment member includes a first element holding section configured to hold the first ultrasonic element, and the second attachment member includes a second element holding section configured to hold the second ultrasonic element.

8. The clamp-on type ultrasonic flow sensor according to claim 1, wherein the fixing member is formed of carbon reinforced resin.

9. The clamp-on type ultrasonic flow sensor according to claim 2, wherein a cross section of the acoustic contact surface has a regular polygonal shape that corresponds to the outer circumferential surface of the pipe and, opposed two sides of which are parallel, and the elastic couplant includes first and second elastic couplants divided by a division surface that includes a straight line passing two vertexes opposed to each other in a cross section of the regular polygonal shape of the acoustic contact surface and a center of the regular polygonal shape and is parallel to the axis of the pipe.

* * * * *